(12) United States Patent
Song et al.

(10) Patent No.: US 12,491,885 B2
(45) Date of Patent: Dec. 9, 2025

(54) VEHICLE SPEED ESTIMATING APPARATUS

(71) Applicants: Hyundai Motor Company, Seoul (KR); Kia Corporation, Seoul (KR)

(72) Inventors: Jin Seok Song, Bucheon-Si (KR); Sang Wook Han, Seoul (KR); Han Seon Ga, Gwangmyeong-Si (KR); Kweon Soo Jeon, Seoul (KR); Nam Han Kim, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 153 days.

(21) Appl. No.: 18/224,693

(22) Filed: Jul. 21, 2023

(65) Prior Publication Data
US 2024/0317234 A1 Sep. 26, 2024

(30) Foreign Application Priority Data

Mar. 24, 2023 (KR) ........................ 10-2023-0038754

(51) Int. Cl.
*B60W 30/18* (2012.01)
*B60W 40/105* (2012.01)

(52) U.S. Cl.
CPC .... *B60W 30/18172* (2013.01); *B60W 40/105* (2013.01); *B60W 2520/105* (2013.01); *B60W 2520/12* (2013.01); *B60W 2520/14* (2013.01); *B60W 2520/16* (2013.01); *B60W 2520/20* (2013.01); *B60W 2520/26* (2013.01); *B60W 2520/28* (2013.01); *B60W 2520/30* (2013.01); *B60W 2540/10* (2013.01); *B60W 2552/15* (2020.02); *B60W 2552/40* (2020.02); *B60W 2720/106* (2013.01)

(58) Field of Classification Search
CPC ........ B60W 30/18172; B60W 40/105; B60W 2552/40; B60W 2552/15; B60W 2520/105; B60W 2540/10; B60W 2720/106
See application file for complete search history.

(56) References Cited

U.S. PATENT DOCUMENTS

| 9,701,289 B2 | 7/2017 | Zhang et al. |
| 10,703,376 B2 | 7/2020 | Coerman et al. |
| 10,981,571 B2 | 4/2021 | Ortmann et al. |
| 11,273,833 B2 | 3/2022 | Lian et al. |

(Continued)

FOREIGN PATENT DOCUMENTS

| KR | 10 1462425 B1 | 12/2014 |
| KR | 10 1543156 B1 | 8/2015 |

*Primary Examiner* — Wade Miles
*Assistant Examiner* — Jerrod Irvin Davis
(74) *Attorney, Agent, or Firm* — Morgan Lewis & Bockius LLP

(57) ABSTRACT

A vehicle speed estimating apparatus includes a vehicle information receiver configured to receive travel information of a vehicle including a wheel speed, a motor torque, and a longitudinal acceleration of the vehicle, a wheel slip determiner configured to determine whether wheel slip occurs, a longitudinal acceleration calibrator configured to calibrate the longitudinal acceleration received from the vehicle information receiver, and a vehicle speed estimator configured for estimating, depending on a determination result of the wheel slip determiner, a vehicle speed using the wheel speed or the calibrated longitudinal acceleration.

25 Claims, 15 Drawing Sheets

(56) References Cited

U.S. PATENT DOCUMENTS

| | | | |
|---|---|---|---|
| 2015/0142240 A1* | 5/2015 | Ozaki | B60L 3/106 |
| | | | 701/22 |
| 2015/0291178 A1 | 10/2015 | You et al. | |
| 2016/0046186 A1* | 2/2016 | Gao | B60T 8/172 |
| | | | 701/90 |
| 2018/0370538 A1* | 12/2018 | Docker | B60W 40/105 |

* cited by examiner

A : ACCELERATION AT PEAK POINT (MAXIMUM POINT OF PITCH ANGLE)
B : ACCELERATION AT STEADY STATE POINT

[Snow Flat Road Surface Takeoff, ESC Off]

[Snow 20% Hill Road Surface Takeoff, TCS On]

[Snow Circle Road Surface Drift Trabel, ESC Off]

VEHICLE SPEED ESTIMATING APPARATUS

CROSS-REFERENCE TO RELATED APPLICATION(S)

The present application claims priority to Korean Patent Application No. 10-2023-0038754 filed on Mar. 24, 2023, the entire contents of which is incorporated herein for all purposes by this reference.

BACKGROUND OF THE PRESENT DISCLOSURE

Field of the Present Disclosure

The present disclosure relates to a vehicle speed estimating apparatus.

Description of Related Art

In general, a vehicle speed may be estimated using information measured by a wheel speed sensor mounted on wheels of a vehicle. As an example of the related art, an optimal wheel for estimating a vehicle speed may be selected, and the vehicle speed may be calculated using a wheel speed of the selected wheel and an acceleration sensor together. Alternatively, the vehicle speed may be estimated using an average value of wheel speeds of wheels in which wheel slip does not occur.

In a method of estimating a speed of a vehicle according to the related art, the speed of the vehicle may not be accurately estimated in a travel situation in which slippage occurs in all wheels provided in the vehicle, in particular, when slippage occurs in all wheels provided in the vehicle in a situation in which the vehicle travels on a hill. In a situation in which slippage occurs in all wheels provided in the vehicle, an optimal wheel may not be selected. Furthermore, slippage also occurs in the selected wheel, and reliability may be low. Furthermore, a method of using an average value of wheel speeds of wheels in which wheel slip does not occur may not be applied when wheel slip occurs in all wheels.

Accordingly, there is a demand for a method for accurately estimating the speed of the vehicle even when slippage occurs in all wheels provided in the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle speed estimating apparatus configured for accurately estimating a speed of a vehicle even in a situation in which slippage occurs in all wheels provided in the vehicle.

According to an aspect of the present disclosure, there is provided a vehicle speed estimating apparatus including a vehicle information receiver configured to receive travel information of a vehicle including a wheel speed, a motor torque, and a longitudinal acceleration of the vehicle, a wheel slip determiner configured to determine whether wheel slip occurs with respect to each wheel, a longitudinal acceleration calibrator configured to calibrate the longitudinal acceleration received from the vehicle information receiver, and a vehicle speed estimator configured for estimating, depending on a result of the determining in the wheel slip determiner for all wheels subject to wheel slip determination, a vehicle speed using the wheel speed or the longitudinal acceleration calibrated by the longitudinal acceleration calibrator.

The wheel slip determiner may be configured for estimating traction force of each wheel, and to determine, based on torque generated by the estimated traction force of each wheel and the motor torque acting on each wheel, whether the wheel slip of the vehicle occurs.

In estimating the traction force of each wheel and a differential value of the wheel speed of each wheel, the wheel slip determiner may be configured to set an initial value of one of the traction force and the differential value of the wheel speed to recursively estimate the traction force and the differential value of the wheel speed.

The wheel slip determiner may be configured to set an initial value of the traction force to "0" to recursively estimate the traction force and the differential value of the wheel speed.

The wheel slip determiner may be configured for estimating torque generated by traction force of each wheel using a disturbance observer.

The wheel slip determiner may be configured to determine, based on whether the vehicle travels off-road, a disturbance gain of the disturbance observer used to estimate the torque generated by the traction force of each wheel.

A value applied to the disturbance gain in a case in which the vehicle travels off-road may be greater than a value applied to the disturbance gain in a case in which the vehicle does not travel off-road.

The wheel slip determiner may be configured to determine whether the wheel slip that occurs is released, using an extremum seeking algorithm.

The vehicle speed estimating apparatus may further include an off-road determiner configured to determine whether a road on which the vehicle is travelling is off-road, using the longitudinal acceleration received from the vehicle information receiver and a que structure configured for storing a preset number of pieces of data.

In a case in which the preset number of pieces of data are enqueued to the queue structure, off-road determiner may be configured to determine whether the road on which the vehicle is travelling is off-road, using statistical values of the enqueued pieces of data.

The off-road determiner may be configured to determine that the road on which the vehicle is travelling is off-road in a case in which an average value of the pieces of data is less than a preset average value and a variance value of the pieces of data is greater than a preset variance value.

The off-road determiner may be configured to initialize data enqueued to the queue structure in a case in which an accelerator pedal stroke value is "0," a difference between a maximum wheel speed and a minimum wheel speed of each wheel is within a preset range, or a road surface friction coefficient is greater than or equal to a preset value.

The longitudinal acceleration calibrator may be configured to determine a first longitudinal acceleration obtained by calibrating a longitudinal acceleration offset and a pitch angle of the longitudinal acceleration received by the vehicle information receiver.

The longitudinal acceleration calibrator may be configured to determine the pitch angle as a value obtained by subtracting a value of the longitudinal acceleration in a steady state from a longitudinal acceleration value at a peak point of the longitudinal acceleration received by the vehicle information receiver.

The longitudinal acceleration value at the peak point may be a maximum value of the longitudinal acceleration within a preset time period, and the steady state may be a stabilized state in which a change in the longitudinal acceleration is maintained within a predetermined range.

The vehicle information receiver may be configured to receive a lateral speed and a yaw rate of the vehicle, and the longitudinal acceleration calibrator may be configured to determine the longitudinal acceleration offset by designing a state space of a Kalman filter using the lateral speed, the yaw rate, and the longitudinal acceleration.

In a case in which the wheel slip determiner concludes that wheel slip occurs in all wheels provided in the vehicle, the longitudinal acceleration calibrator may be configured to apply a value of the longitudinal acceleration offset before wheel slip occurs.

In a case in which it is determined by the wheel slip determiner that wheel slip occurring in at least one wheel provided in the vehicle is released, the longitudinal acceleration calibrator may be configured to apply the value of the longitudinal acceleration offset before wheel slip occurs within a preset time period from a point in time at which it is determined that wheel slip is released.

The vehicle information receiver may be configured to receive a lateral speed and a yaw rate of the vehicle. In the case in which it is determined by the wheel slip determiner that wheel slip occurring in at least one wheel provided in the vehicle is released, the longitudinal acceleration calibrator may be configured to update the value of the longitudinal acceleration offset, using a Kalman filter using the lateral speed, the yaw rate, and the longitudinal acceleration, when a preset time period from a point in time at which it is determined that wheel slip is released is exceeded.

In a case in which drift occurs in the vehicle, the longitudinal acceleration calibrator may be configured to determine a second longitudinal acceleration obtained by performing calibration of multiplying the first longitudinal acceleration by a weight.

The weight may be preset to correspond to a lateral slippage angle, and the weight may be set to include a smaller value as the lateral slippage angle increases.

The longitudinal acceleration calibrator may be configured to determine a third longitudinal acceleration obtained by calibrating a change in physical quantity of a gradient of a road, on which the vehicle is travelling, of the first longitudinal acceleration.

The longitudinal acceleration calibrator may be configured to determine a change in the physical quantity of the gradient of the road on which the vehicle is travelling, considering a change in stroke of an accelerator pedal and a change in the longitudinal acceleration together.

The vehicle speed estimator may be configured for estimating a speed of the vehicle using an average value of wheel speeds of wheels in which wheel slip does not occur, when it is determined by the wheel slip determiner that wheel slip does not occur in at least one wheel.

In a case in which it is determined by the wheel slip determiner that wheel slip occurs in all wheels, the vehicle speed estimator may be configured for estimating a speed of the vehicle using the longitudinal acceleration calibrated by the longitudinal acceleration calibrator.

The vehicle speed estimator may be configured to preset a vehicle speed gradient value. In a case in which a vehicle speed gradient formed by the estimated vehicle speed deviates from the preset vehicle speed gradient value, the vehicle speed estimator may be configured to determine a vehicle speed corresponding to the vehicle speed gradient as an estimated vehicle speed.

The vehicle speed gradient value may be preset to correspond to a road surface friction coefficient of a road on which the vehicle is travelling, and may increase as the road surface friction coefficient increases.

According to example embodiments of the present disclosure, even when slippage occurs in all wheels provided in a vehicle, a speed of the vehicle may be accurately estimated using a longitudinal acceleration calibrated depending on various situations.

According to example embodiments of the present disclosure, whether wheel slip occurs may be accurately determined without a delay time period.

According to example embodiments of the present disclosure, even when all wheels provided in a vehicle slippage off-road, a speed of the vehicle may be accurately determined.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
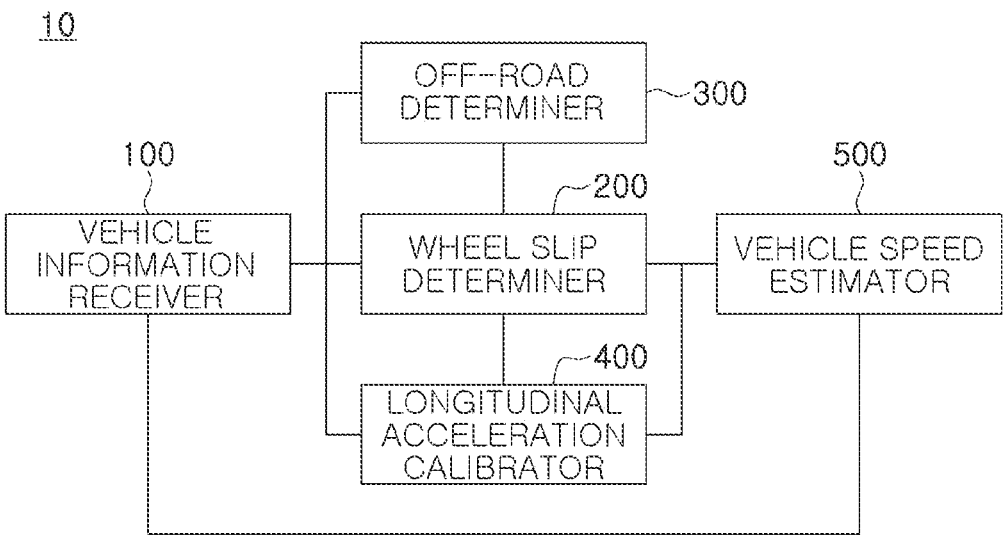
FIG. 1 is a functional block diagram illustrating a vehicle speed estimating apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various modifications may be made to the example embodiments. Here, the example embodiments are not construed as limited to the present disclosure and should be understood to include all changes, equivalents, and replacements within the idea and the technical scope of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in the present specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms include the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

Furthermore, all wheels described herein, or all wheels subject to measurement are applicable not only to four-wheel drive vehicles, but also to multi-wheel drive vehicles. Furthermore, all wheels, subject to measurement, of the multi-wheel drive vehicle may include a case in which some of wheels of the multi-wheel drive vehicle are measured. For example, all wheels may include a case in which only four of wheels of a six-wheel drive vehicle are measured.

Hereinafter, with reference to the accompanying drawings, exemplary embodiments of the present disclosure will be described in more detail.

FIG. 1 is a functional block diagram illustrating a vehicle speed estimating apparatus 10 according to an exemplary embodiment of the present disclosure.

The vehicle speed estimating apparatus 10 according to an exemplary embodiment of the present disclosure may apply a method of estimating a wheel speed depending on whether wheel slip occurs in all wheels of a vehicle in a different manner.

When wheel slip does not occur in any one wheel of the vehicle, a speed of the vehicle may be estimated based on an average of measured wheel speeds of wheels in which wheel slip does not occur.

Furthermore, when wheel slip occurs in all wheels of the vehicle, the vehicle speed may be estimated by integrating a longitudinal acceleration of the vehicle. However, when the longitudinal acceleration of the vehicle is used, errors may be accumulated, making it difficult to trust the estimated speed.

Accordingly, the vehicle speed estimating apparatus according to an exemplary embodiment of the present disclosure may calibrate the longitudinal acceleration of the vehicle depending on travel conditions, improving the accuracy of the estimated vehicle speed.

Here, the wheel speed may be verified by detecting a rotation speed of each wheel using a wheel speed sensor provided in the vehicle. A method of verifying a rotation speed of a wheel using the wheel speed sensor may include a method using a light emitting diode and a photodiode and a method using a Hall sensor. The method using the light emitting diode and the photodiode may be a method in which a computer analyzes the number of times that the light emitting diode and the photodiode are energized through holes in a rotating disk and is configured to determine revolutions per minutes (RPM).

The Hall sensor method may be a method in which a voltage is generated in a direction perpendicular to a current and a magnetic field when the magnetic field is generated in a conductor through which the current flows. In the present method, the current may flow through a Hall element of the Hall sensor, and the computer or a controller may recognize a voltage generated whenever a protruding portion of a rotating body comes into contact with the sensor, and may be configured to determine RPM.

Furthermore, in a method of estimating a speed of a vehicle, the speed of the vehicle may be estimated by measuring revolutions per minute (rpm) of an engine, or the speed of the vehicle may be estimated by measuring RPM of a transmission output shaft. In the method of using the RPM of the engine, the vehicle speed may be estimated by dividing a product of the engine RPM and a dynamic radius of a tire by a product of a gear ratio of a currently travelling transmission gear and a final reduction ratio.

Furthermore, in the method of using the RPM of the transmission output shaft, the vehicle speed may be estimated by multiplying a product of the RPM of the transmission output shaft and the dynamic radius of the tire by the final reduction ratio.

Furthermore, the vehicle speed may be estimated by directly measuring a rotation speed of a shaft including a wheel mounted thereon and rotating integrally with the wheel, using the above-described sensor or the like, and multiplying the rotation speed by the dynamic radius of the tire. However, the present disclosure is not limited thereto, and various well-known methods configured for estimating the vehicle speed may be used.

Referring to FIG. 1, the vehicle speed estimating apparatus 10 according to an exemplary embodiment of the present disclosure may include a vehicle information receiver 100, a wheel slip determiner 200, an off-road determiner 300, a longitudinal acceleration calibrator 400, and a vehicle speed estimator 500.

The vehicle information receiver 100 may receive information measured or determined from various sensors provided in the vehicle. The vehicle information receiver 100 may directly obtain information from the sensors provided in the vehicle, or may receive information through a control unit (for example, a vehicle control unit (VCU) or the like) connected to each sensor to collect information. The vehicle information receiver 100 may receive at least a portion of vehicle information such as a wheel speed and motor torque of each wheel provided in the vehicle, a longitudinal acceleration of the vehicle, a yaw rate of the vehicle, a lateral slippage angle, a lateral speed, a stroke of an accelerator pedal, a road surface friction coefficient of a road on which the vehicle is travelling, and the like.

The wheel slip determiner 200 may be configured to determine whether wheel slip occurs using a relationship between forces acting on a wheel. The wheel slip determiner 200 may be configured to determine whether wheel slip occurs by comparing ab estimated traction force acting on the wheel with a value of the motor torque transmitted from the vehicle information receiver.

In an exemplary embodiment of the present invention, the apparatus of FIG. 1 may be implemented by a controller in a form of hardware or software, or in a combination of hardware and software.

Figure 2:
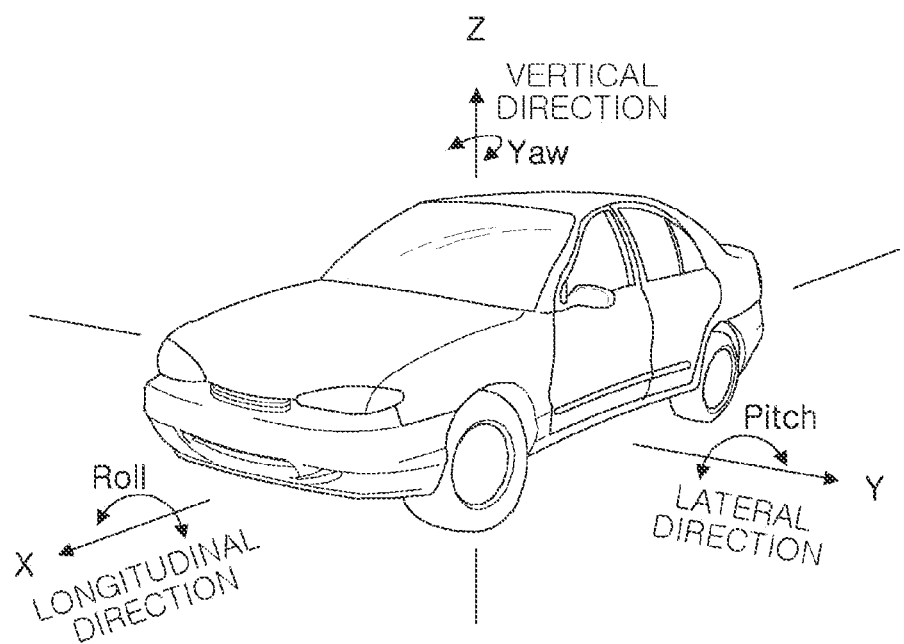
FIG. 2 is a diagram illustrating a coordinate system of a vehicle according to an exemplary embodiment of the present disclosure.
Figure 3:
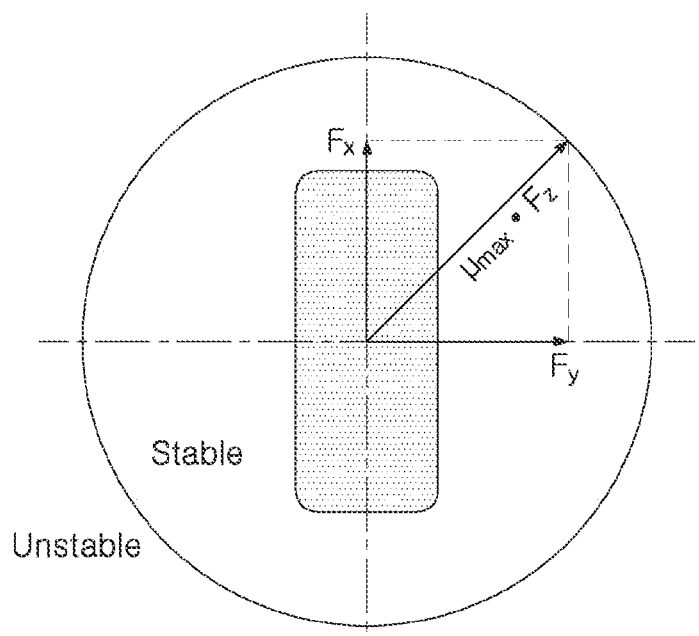
FIG. 3 is a diagram illustrating a friction circle acting on a wheel of a vehicle.
Figure 4:
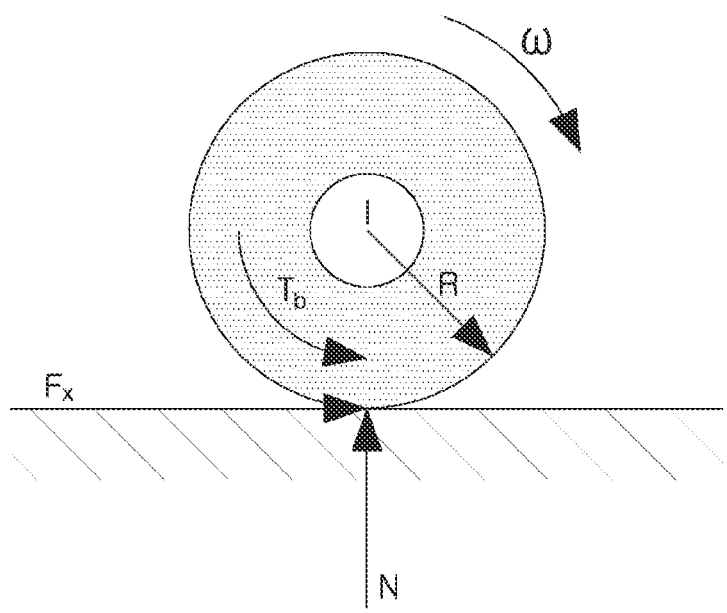
FIG. 4 is a diagram illustrating force acting on a wheel of a travelling vehicle.

FIG. 2 is a diagram illustrating a coordinate system of a vehicle according to an exemplary embodiment of the present disclosure. FIG. 3 is a diagram illustrating a friction circle acting on a wheel of a vehicle. FIG. 4 is a diagram illustrating force acting on a wheel of a travelling vehicle.

Referring to FIG. 2, a coordinate system according to exemplary embodiment of the present disclosure may be described. A longitudinal direction of the vehicle may be a longitudinal direction of the vehicle, and may be referred to as an X-axis direction. In addition, a lateral direction of the vehicle may be a left and right direction of the vehicle, and may be referred to as a Y-axis direction. In addition, a vertical direction of the vehicle may be a height direction of the vehicle, and may be a Z-axis direction. In addition, a rotation motion about an X-axis may be referred to as roll, a rotation motion about a Y-axis may be referred to as pitch, and a rotation motion about a Z-axis may be referred to as yaw.

The wheel slip determiner 200 according to an exemplary embodiment of the present disclosure may compare a force acting on motor torque and a wheel and traction force estimated using a friction circle to determine whether wheel slip occurs. The friction circle illustrated in FIG. 3 may represent a friction limit acting on the wheel in a form of a circle, and may be a limit range of a total sum of forces acting on the wheel during travelling of the vehicle. In other words, it may be determined that wheel slip occurs when a resultant force of a longitudinal force generated on the wheel and a lateral force generated on the wheel deviates from the friction circle. Here, various methods of estimating a maximum road surface friction coefficient of a road surface of the friction circle may be used. For example, the maximum road surface friction coefficient or a force acting on a tire may be estimated using a gradient of a μ(mue)-slippage curve, and the maximum road surface friction coefficient may be estimated using a stochastic method. However, the present disclosure is not limited thereto, and various methods configured for estimating the maximum road surface friction coefficient may be used.

As in an exemplary embodiment of the present disclosure, traction force of the wheel may be estimated using a relationship between forces acting on the wheel, and then torque generated by the estimated traction force may be compared to an actually acting motor torque, determining whether wheel slip occurs. That is, a value of the motor toque acting on the wheel may be compared to a value of the torque generated by the estimated traction force, using the relationship between the forces acting on the wheel to be described below, without estimating a road surface friction coefficient.

Generally, whether wheel slip occurs was determined by comparing a speed difference between a wheel speed sensor and an acceleration sensor. Accordingly, generally, whether wheel slip occurs was determined by comparing a wheel speed and an acceleration measured at a predetermined time interval, that is, after a delay period of time, to prevent sensitive operation. Conversely, the wheel slip determiner 200 according to an exemplary embodiment of the present disclosure may use a method using a difference in force acting on the tire so that the delay period of time for preventing sensitive operation may not be necessary, immediately determining whether wheel slip occurs.

Referring to FIG. 4, various forces may act on the wheel of the vehicle. An equilibrium equation formed by the forces acting on the wheel of the vehicle may be represented by Equation 1 below.

$$I\dot{\omega} = T_m - T_b - RF_x - RF_r \qquad \text{[Equation 1]}$$

Here, I represents a moment of inertia of a wheel, $\dot{\omega}$ represents a differential value of a wheel speed, $T_m$ represents a value of motor torque, $T_b$ represents a value of a torque caused by a brake. $F_x$ represents traction force generated on a wheel, R represents a value of a wheel having a tire, and $F_r$ represents a rolling resistance acting on a wheel.

A state of estimating a speed of the vehicle may be a state in which the vehicle is travelling, and thus, $T_b$ may be ignored and the rolling resistance may also be ignored.

In estimating traction force of the vehicle, the wheel slip determiner 200 according to an exemplary embodiment of the present disclosure may use a disturbance observer (DOB) including a disturbance gain. Here, the DOB may be one of control methods of performing compensation by observing or estimating the influence of disturbance on a system. Furthermore, disturbance according to an exemplary embodiment of the present disclosure may be a torque $\hat{F}_x R$ generated by the traction force, and the DOB may more accurately determine the torque generated by the traction force even when the vehicle travels off-road by adjusting a disturbance gain value depending on a condition of the road surface.

$$\hat{F}_x = I\left(\hat{\omega} - \frac{I\omega}{R}\right) \quad \text{[Equation 2]}$$

Here, I represents a disturbance gain. Furthermore, a sign of "^" may be added to distinguish estimated values from values received by the vehicle information receiver 100. For example, $\hat{F}_x$ represents an estimated traction force of a vehicle.

As exemplarily represented by Equation 2, the estimated traction force may be determined including a disturbance gain. The disturbance gain may be set differently depending on a condition of a road surface so that the estimated traction force may be accurately determined despite a change in the condition of the road surface.

Here, the wheel slip determiner 200 may be configured to determine whether wheel slip occurs using a DOB including a disturbance gain, adjusting a degree of noise filtering for wheel vibrations generated by the condition of the road surface to adjust the sensitivity of the DOB. Thus, the accuracy of determining whether wheel slip occurs may be improved depending on whether the vehicle travels off-road. A disturbance gain value of the DOB may be applied differently depending on the road condition, whether the vehicle is travelling off-road. As the disturbance gain decreases, the noise filtering effect may increase, and the insensitivity of slippage determination may increase. Conversely, as the disturbance gain increases, the noise filtering effect may decrease, and the sensitivity of slippage determination may increase.

Accordingly, when a road on which the vehicle is traveling is off-road, a greater disturbance gain value of the DOB may be applied than a case in which the road is not off-road. Thus, whether wheel slip occurs may be accurately determined with less influence from the road condition.

Furthermore, using Equation 1 above, a wheel speed differential value of a wheel may be estimated. When the estimated wheel speed differential value of the wheel may be represented by Equation 3.

$$\dot{\hat{\omega}} = \frac{T_m - T_b}{R} - \hat{F}_x \quad \text{[Equation 3]}$$

Here, as in Equation 1, a $T_b$ value may be ignored.

Equation 2 and Equation 3 may be recursively determined with respect to each other. For example, a differential value $\dot{\hat{\omega}}$ of a wheel speed of a wheel estimated in Equation 3 may be determined, and the estimated differential value $\dot{\hat{\omega}}$ of the wheel speed of the wheel may be integrated to determine an estimated wheel speed value $\hat{\omega}$ of the wheel. When the estimated wheel speed value $\hat{\omega}$ of the wheel is applied to Equation 2, an estimated traction force $\hat{F}_x$ of the vehicle may be determined. The traction force $\hat{F}_x$ of the vehicle estimated in Equation 2 may be applied to Equation 3 to determine the estimated wheel speed differential value $\dot{\hat{\omega}}$ of the wheel.

In the recursive determination process, when the estimated differential value $\dot{\hat{\omega}}$ of the wheel speed of the wheel is initially determined, an initial value of the estimated traction force $\hat{F}_x$ of the vehicle may need to be set so that Equations 2 and 3 may be recursively determined. Here, control may be initiated in a state in which the vehicle is stopped so that the initial value of the estimated traction force $\hat{F}_x$ of the vehicle may be set to "0." The estimated wheel speed differential value $\dot{\hat{\omega}}$ of the wheel may be determined using Equation 3 by setting the initial value of the estimated traction force $\hat{F}_x$ of the vehicle, and the estimated traction force $\hat{F}_x$ of the vehicle may be determined using the estimated wheel speed differential value $\dot{\hat{\omega}}$ of the wheel and Equation 2.

The present disclosure is not limited thereto, and Equations 2 and 3 may be recursively determined by determining the estimated traction force $\hat{F}_x$ of the vehicle by setting the estimated differential value $\dot{\hat{\omega}}$ of the wheel speed of the wheel.

The wheel slip determiner 200 according to an exemplary embodiment of the present disclosure may be configured to determine whether wheel slip occurs depending on a result of Equation 4 below. The wheel slip determiner 200 may be configured to determine that wheel slip occurs, when Equation 4 below is satisfied.

$$\hat{F}_x R < \text{MOTOR TORQUE TRANSMITTED TO WHEEL} \quad \text{[Equation 4]}$$

Here, the motor torque transmitted to the wheel may be motor torque acting on the wheel subject to wheel slip determination. For example, in the case of an in-wheel motor generating motor torque for each individual wheel, a value of the motor torque may be $T_m$, and in a case in which a pair of front wheels or a pair of rear wheels and a motor are connected to each other to generate motor torque, a value of the motor torque may be $$\frac{T_m}{2}.$$

That is, motor torque acting on each wheel may be compared to a torque $\hat{F}_x R$ expected to be generated by an estimated traction force to determine whether wheel slip occurs.

The wheel slip determiner 200 according to an exemplary embodiment of the present disclosure may be configured to determine whether the wheel slip that occurs is released through a process different from a process of determining whether wheel slip occurs A method of determining whether wheel slip that occurs is released may use an extremum seeking algorithm. Here, the extremum seeking algorithm may be an algorithm seeking a maximum extremum using a high pass filter (HPF) and a high-frequency sine wave. The extremum seeking algorithm may be one of optimal control algorithms. The extremum seeking algorithm may be an algorithm seeking a maximum extremum based on data analysis rather than a mathematical model, assuming that a friction coefficient-slippage (μ(mue)-slippage) curve is an unknown cost function.

An estimated motor torque $T_m$ of Equation 5 below may be determined using the extremum seeking algorithm.

$$\hat{T}_m = \hat{F}_x R + I(\dot{\omega}^d + k e_\omega) \quad [\text{Equation 5}]$$

Here, $\dot{\omega}^d$ represents a differential value of an optimal target value of a wheel speed determined using the extremum seeking algorithm, $e_\omega$ represents a difference between an optimal target value of a wheel speed received from the vehicle information receiver 100 and the optimal target value of the wheel speed determined using the extremum seeking algorithm, and k represents a constant.

The wheel slip determiner 200 may compare a determined estimated motor torque value $\hat{T}_m$ to motor torque value $T_m$ received by the vehicle information receiver 100, and may verify whether slippage no longer occurs in wheels provided in the vehicle to determine whether the wheel slip that occurs is released. When the estimated motor torque value $\hat{T}_m$ determined based on Equation 5 is greater than the motor torque value $T_m$ received from the vehicle information receiver 100, the wheel slip determiner 200 may be configured to determine that wheel slip does not occur.

Hereinafter, a process of determining whether wheel slip is released using the extremum seeking algorithm will be described in more detail.

In a method of determining a driving force following an optimal slippage ratio using the extremum seeking algorithm, an optimal target wheel speed $\omega^d$ may be determined using Equation 6, and an estimation error $e_\omega$ of a wheel speed, a difference between the determined optimal target wheel speed $\omega^d$ and a wheel speed $\omega$ received by the vehicle information receiver 100, may be determined as shown in Equation 7.

$$\omega^d(t+1) = \omega^d(t) + A\sin\omega t + \varepsilon \text{sign}(F) \quad [\text{Equation 6}]$$

$$\dot{\omega}^d(t) = \frac{(A\sin\omega t + \varepsilon \text{sign}(F))}{\text{sampling time}}$$

Here, $\omega^d$ represents an optimal target wheel speed, $\dot{\omega}^d$ represents a differential value of $\omega^d$, $\varepsilon$ represents a command convergence gain, and F represents HPF($\varepsilon$)*A sin $\omega t$.

$$e_\omega = \omega^d - \omega \quad [\text{Equation 7}]$$

Here, $e_\omega$ represents an estimation error of a wheel speed, and $\omega$ represents an actual wheel speed of the vehicle received by the vehicle information receiver 100.

A value of Equation 8 may be obtained by differentiating the estimation error $e_\omega$ of the wheel speed in Equation 7 and converting and substituting the above-described Equation 1, and Equation 5 may be obtained by summarizing those.

$$\dot{e}_\omega = \dot{\omega}^d - \frac{T_m - T_b - RF_x}{1} \quad [\text{Equation 8}]$$

Here, as in Equation 1, a value $T_b$ may be ignored.

Through the above process, the wheel slip determiner 200 may derive an equation such as Equation 5, determine an optimum limit driving torque, and compare the determined optimal limit driving torque with an actual driving torque received by the vehicle information receiver 100. When the optimal limit driving torque has a value greater than that of the actual driving torque for a predetermined time period, it may be determined that a wheel is in a stable state, and wheel slip that has occurred is released.

The wheel slip determiner 200 according to an exemplary embodiment of the present disclosure may be configured to determine whether wheel slip occurs based on a force acting on the wheel, and thus may not require a delay period of time for sensitivity adjustment, unlike the related art using a difference between a wheel speed sensor and a longitudinal speed sensor. Furthermore, whether slippage of a wheel in which slippage occurs is released may be determined using the extremum seeking algorithm, improving the accuracy of determining whether slippage is released.

Referring back to FIG. 1, the vehicle speed estimating apparatus 10 according to an exemplary embodiment of the present disclosure may include a longitudinal acceleration calibrator 400.

The longitudinal acceleration calibrator 400 may perform calibration of removing components affecting a longitudinal acceleration depending on a travel state of the vehicle. For example, when the vehicle accelerates while travelling on a hill, calibration may be performed to remove a pitch angle generated when an upper portion of the vehicle is lifted. Furthermore, when the vehicle drifts, the influence of lateral slippage may be removed. When a gradient of a road on which the vehicle is travelling changes rapidly, the longitudinal acceleration calibrator 400 may perform calibration of removing a change in the gradient of the road on which the vehicle is travelling. When wheel slip occurs in all wheels of the vehicle, the vehicle speed estimating apparatus 10 may estimate a vehicle speed by integrating the longitudinal acceleration, more accurately estimating the vehicle speed through calibration of the longitudinal acceleration.

Figure 5:
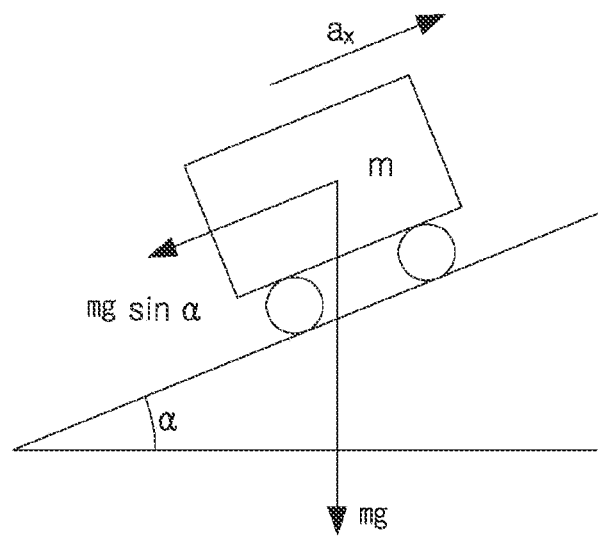
FIG. 5 is a diagram illustrating force acting on a vehicle travelling on a hill.
Figure 6:
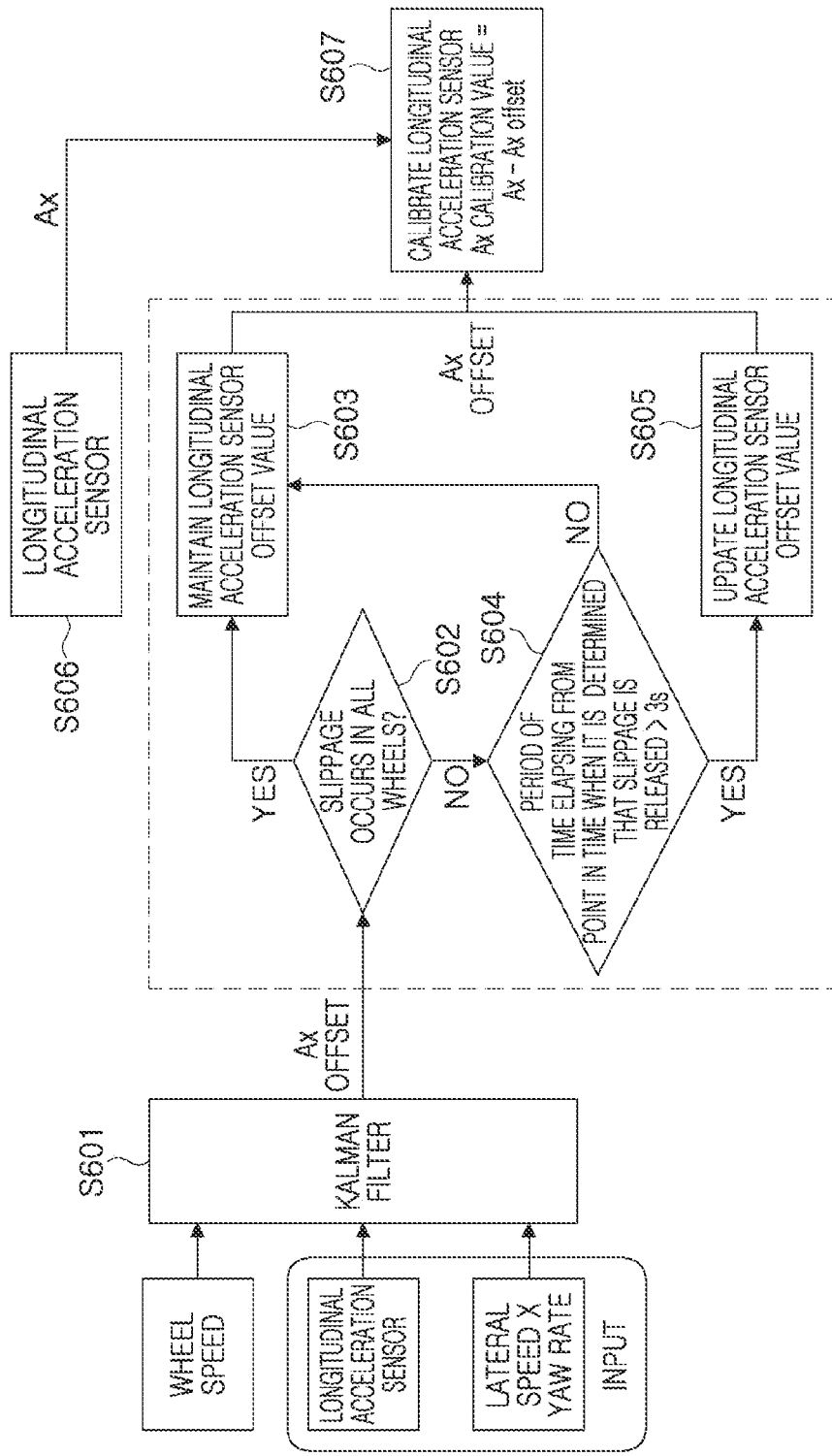
FIG. 6 is a diagram illustrating a process of calibrating a longitudinal acceleration sensor using a Kalman filter according to an exemplary embodiment of the present disclosure.
Figure 7:
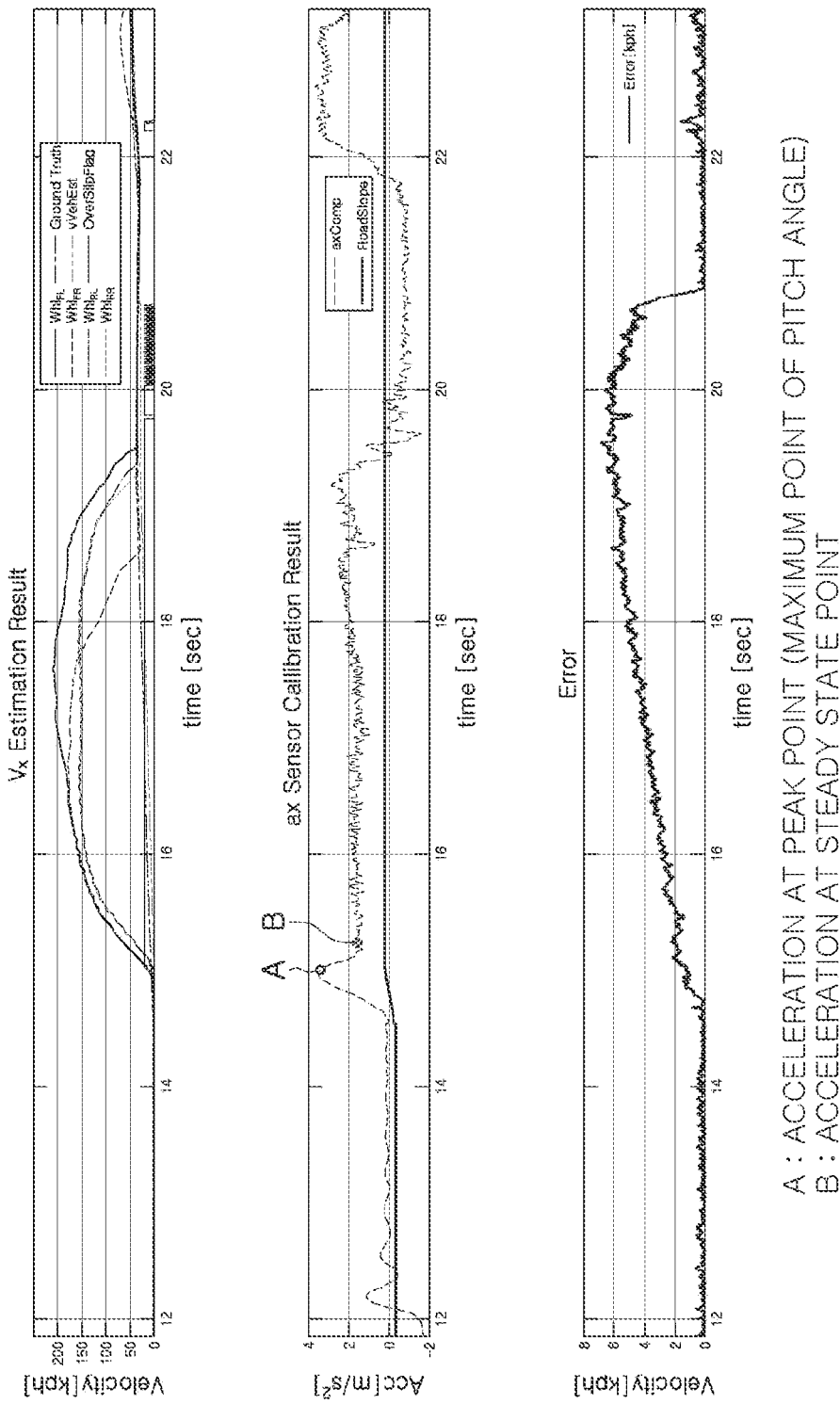
FIG. 7 is a diagram illustrating an error between a measured acceleration and an estimated speed before a pitch angle is removed.
Figure 8:
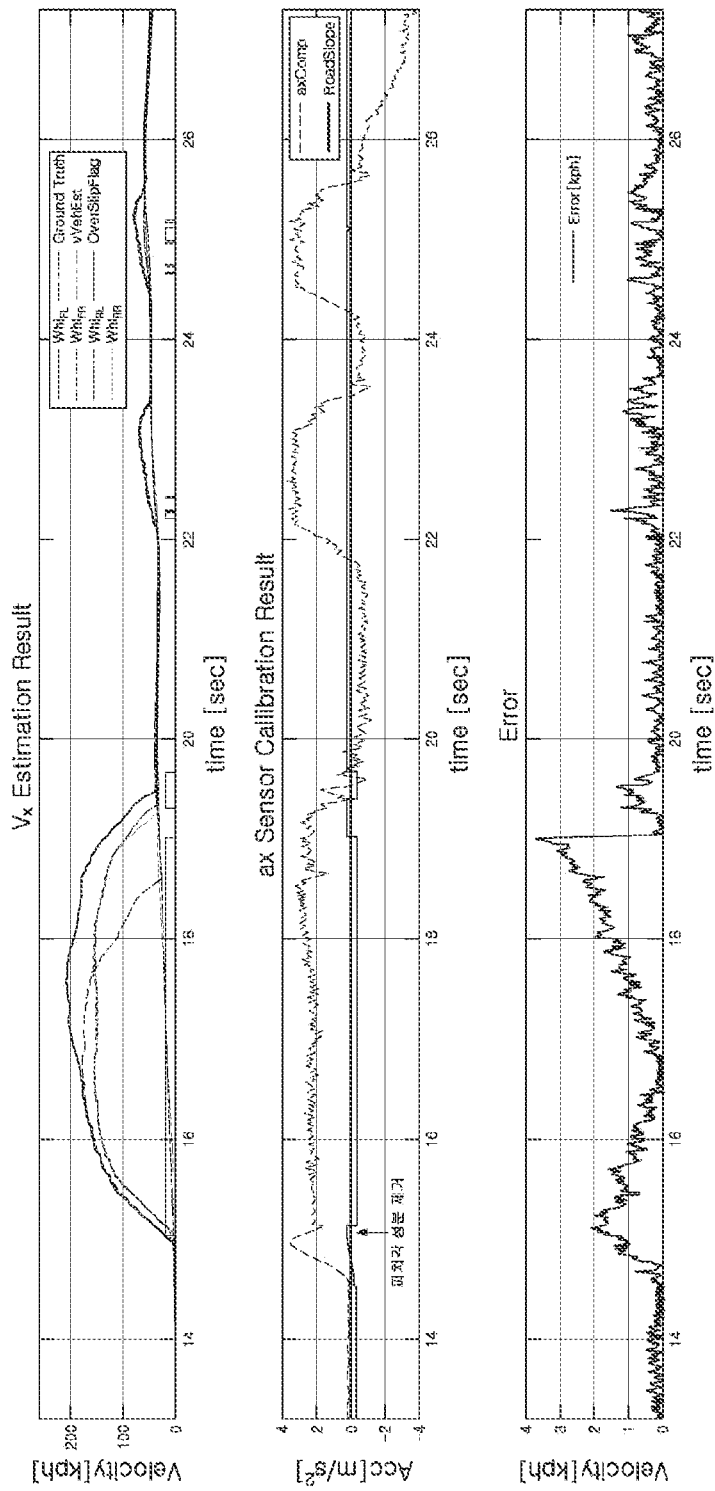
FIG. 8 is a diagram illustrating an error between a measured acceleration and an estimated speed in a state in which a pitch angle is removed according to an exemplary embodiment of the present disclosure.

FIG. 5 is a diagram illustrating force acting on a vehicle travelling on a hill. FIG. 6 is a diagram illustrating a process of calibrating a longitudinal acceleration sensor using a Kalman filter according to an exemplary embodiment of the present disclosure. FIG. 7 is a diagram illustrating an error between a measured acceleration and an estimated speed before a pitch angle is removed. FIG. 8 is a diagram illustrating an error between a measured acceleration and an estimated speed in a state in which a pitch angle is removed according to an exemplary embodiment of the present disclosure.

Referring to FIG. 5, each force acting on a vehicle accelerating on a hill is disclosed. An acceleration value measured by an acceleration sensor of the vehicle may be a value obtained by subtracting a value obtained by multiplying the acceleration value of the vehicle by a force acting by gravity and a product of a lateral speed and a yaw rate of the vehicle. Here, the force acting by gravity of the vehicle may be a value obtained by adding a pitch angle θ generated during acceleration to an inclination angle α of the road on which the vehicle is travelling. The longitudinal acceleration calibrator may need to estimate a longitudinal acceleration offset using a Kalman filter, and may calibrate a longitudinal acceleration value measured by the acceleration sensor of the vehicle using the estimated longitudinal acceleration offset. The longitudinal acceleration calibrator 400 according to an exemplary embodiment of the present disclosure may estimate the longitudinal acceleration offset value of the vehicle using the Kalman filter, and may calibrate the longitudinal acceleration value using the estimated offset value.

Referring to FIG. 6, a flowchart of estimating an offset value of a longitudinal acceleration sensor using the Kalman filter may be verified. To apply the Kalman filter, a state space may be designed based on the configuration illustrated in FIG. 5. A state space for applying the Kalman filter may be represented by Equations 9 to 11 below.

$$\dot{x} = \begin{bmatrix} 0 & -g \\ 0 & 0 \end{bmatrix} x + \begin{bmatrix} 1 & 1 \\ 0 & 0 \end{bmatrix} u \quad \text{[Equation 9]}$$

$$x = \begin{bmatrix} V_x \\ \sin(\alpha + \theta) \end{bmatrix} \quad \text{[Equation 10]}$$

$$u = [a_{x,m} \ V_y \varphi] \quad \text{[Equation 11]}$$

Here, g represents a gravitational acceleration, $V_x$ represents a longitudinal speed of a vehicle, $\alpha$ represents an inclination angle of a road on which the vehicle is travelling, and $\theta$ represents a pitch angle. Furthermore, an input matrix of the Kalman filter may be a longitudinal acceleration sensor value, and a product of a lateral speed and a yaw rate of the vehicle.

The longitudinal acceleration calibrator 400 may be configured to determine a longitudinal acceleration offset value by inputting a wheel speed, a longitudinal acceleration $a_{x,m}$, and a product $V_y \varphi$ of the lateral speed and the yaw rate measured using the Kalman filter (S601).

The longitudinal acceleration calibrator 400 may perform calibration of removing a longitudinal acceleration offset value determined using the Kalman filter from a longitudinal acceleration value received from the vehicle information receiver 100.

Referring to FIGS. 6 and 1 together, the longitudinal acceleration calibrator 400 may apply a longitudinal acceleration offset value (Ax offset) estimated using the Kalman filter differently depending on whether wheel slip occurs in all wheels provided in the vehicle. When wheel slip occurs in all wheels of the vehicle, it may be difficult to trust the estimated longitudinal acceleration offset value. Accordingly, whether wheel slip occurs in all wheels provided in the vehicle may be determined (S602). When wheel slip occurs in all wheels provided in the vehicle, the estimated longitudinal acceleration offset value before wheel slip occurs in all wheels of the vehicle may be maintained (S603).

In addition, when the wheel slip determiner 200 determines that wheel slip is released, the longitudinal acceleration calibrator 400 may determine whether a predetermined time period (for example, 3 seconds) elapses from a point in time when it is determined that wheel slip is released in at least one wheel of the vehicle (S604). When the predetermined time period (for example, 3 seconds) elapses from the point in time when it is determined that wheel slip is released in at least one wheel of the vehicle, the longitudinal acceleration offset value estimated using the Kalman filter may be applied again (S605). Otherwise, a previous longitudinal acceleration offset value may be applied without change (S603).

The longitudinal acceleration calibrator 400 may calibrate a longitudinal acceleration offset value determined using the Kalman filter to a longitudinal acceleration received from the vehicle information receiver 100 (S606 and S607).

Here, the calibration of the longitudinal acceleration sensor using the Kalman filter may be performed under the assumption that a vehicle speed measured using a wheel speed sensor corresponds to an actual vehicle speed. Therefore, when wheel slip occurs in all wheels provided in the vehicle, the vehicle speed measured using the wheel speed sensor and the actual vehicle speed may not correspond so that an offset value of the longitudinal acceleration sensor may not be accurately estimated using the Kalman filter.

Furthermore, even after wheel slip is released in at least one wheel of the vehicle, a predetermined time period may be required to estimate a longitudinal acceleration offset value having reliability due to the nature of the Kalman filter. Accordingly, even when wheel slip is released in at least one wheel, a previous estimated offset value may be applied without change before a preset time period (for example, 3 seconds) elapses, and an offset value estimated using the Kalman filter may be applied after a predetermined time period elapses. Here, information on whether wheel slip occurs and whether wheel slip is released may be transmitted from the wheel slip determiner 200.

The longitudinal acceleration calibrator 400 may remove the longitudinal acceleration offset value estimated using the Kalman filter from the longitudinal acceleration received by the vehicle information receiver 100. The estimated longitudinal acceleration offset value of the vehicle using the Kalman filter may be a value obtained by adding a pitch angle to an inclination angle so that calibration may be further performed on the pitch angle later. Here, a longitudinal acceleration obtained by removing the pitch angle from the longitudinal acceleration value calibrated using the Kalman filter may be referred to as a first longitudinal acceleration.

FIG. 7 is a diagram illustrating an error between a measured acceleration and an estimated speed before a pitch angle is removed. FIG. 8 is a diagram illustrating an error between a measured acceleration and an estimated speed in a state in which a pitch angle is removed according to an exemplary embodiment of the present disclosure.

Referring to FIG. 7, the pitch angle may be a value obtained by subtracting a longitudinal acceleration value (B) at a steady state point from a longitudinal acceleration value (A) at a longitudinal acceleration peak point. Furthermore, referring to FIG. 7, in the case of using a method of estimating a speed by integrating and determining a longitudinal acceleration, as in an exemplary embodiment of the present disclosure, when the pitch angle is not subtracted, the pitch angle may remain and act as a cumulative error, resulting in a decrease in the reliability of the entire system.

Here, the pitch angle may be generated at the moment when an acceleration of a vehicle rapidly changes, such as when the vehicle starts, and may be greatly generated at the moment when the acceleration of the vehicle rapidly changes. Thereafter, the pitch angle may be ignored. Accordingly, the longitudinal acceleration value at the peak point may be a maximum value of a longitudinal acceleration measured within a preset time period from when the vehicle starts. Furthermore, the steady state may be a state in which the pitch angle of the vehicle may be ignored after the peak point, that is, a stabilized state in which a change in the longitudinal acceleration is maintained within a predetermined range.

Referring back to FIG. 8, an error of an estimated vehicle speed may be improved as compared to FIG. 7 by removing the pitch angle. Comparing FIG. 7 and FIG. 8 to each other, it may be confirmed that there is an error improvement effect of about 2.4 kph with respect to a maximum error.

Figure 9:
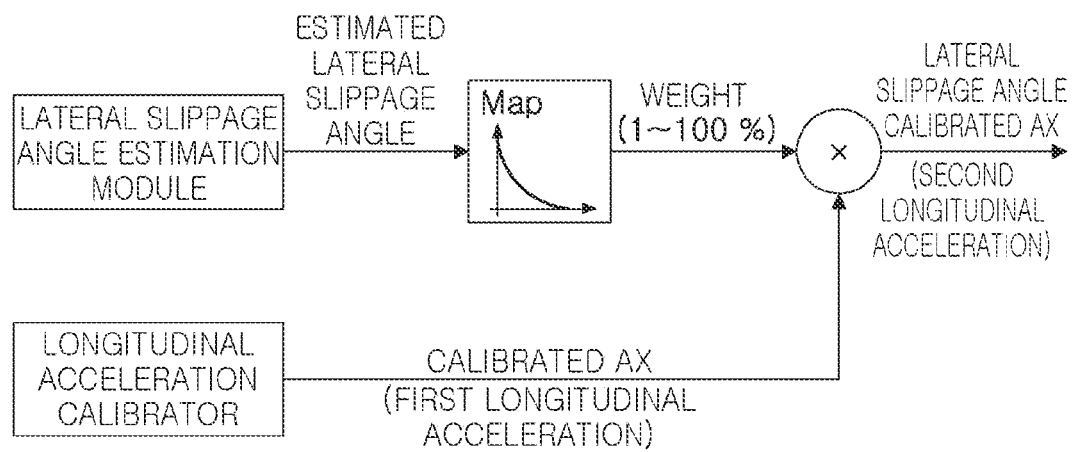
FIG. 9 is a diagram illustrating a longitudinal acceleration being additionally calibrated when a vehicle drifts according to an exemplary embodiment of the present disclosure.
Figure 10:
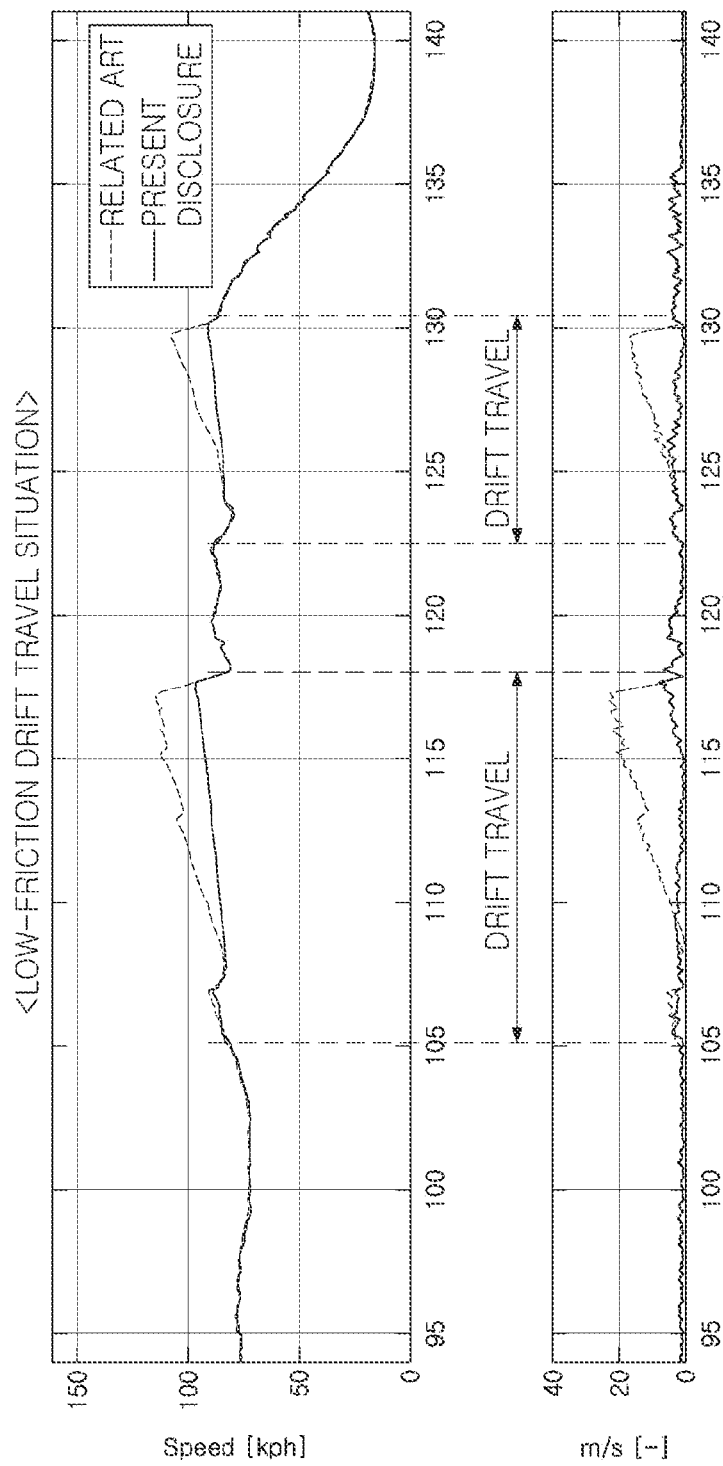
FIG. 10 is a diagram illustrating a difference in estimated speed depending on whether additional calibration is performed during drift according to an exemplary embodiment of the present disclosure.

FIG. 9 is a diagram illustrating a longitudinal acceleration being additionally calibrated when a vehicle drifts according to an exemplary embodiment of the present disclosure. FIG. 10 is a diagram illustrating a difference in estimated speed depending on whether additional calibration is performed during drift according to an exemplary embodiment of the present disclosure.

Referring to FIG. 9, the longitudinal acceleration calibrator 400 may perform calibration of adding a weight to a calibrated longitudinal acceleration during limit handling travelling of a vehicle, that is, when drift occurs. The longitudinal acceleration calibrator 400 may receive information on a lateral slippage angle of the vehicle through the vehicle information receiver 100. The longitudinal acceleration may be calibrated by presetting a weight depending on the lateral slippage angle of the vehicle and multiplying the weight depending on the lateral slippage angle of the vehicle by the first longitudinal acceleration. An acceleration obtained by additionally calibrating the first longitudinal depending on the lateral slippage angle of the vehicle may be referred to as a second longitudinal acceleration. The second longitudinal acceleration may be set by multiplying the first longitudinal acceleration by a smaller weight as the lateral slippage angle of the vehicle increases, and by multiplying the first longitudinal acceleration by a larger weight as the lateral slippage angle of the vehicle decreases. Here, the weight may include a value between 0 and 1. A weight close to 0 may be applied as the lateral slippage angle of the vehicle increases, and a weight close to 1 may be applied as the lateral slippage angle of the vehicle decreases.

Figure 11:
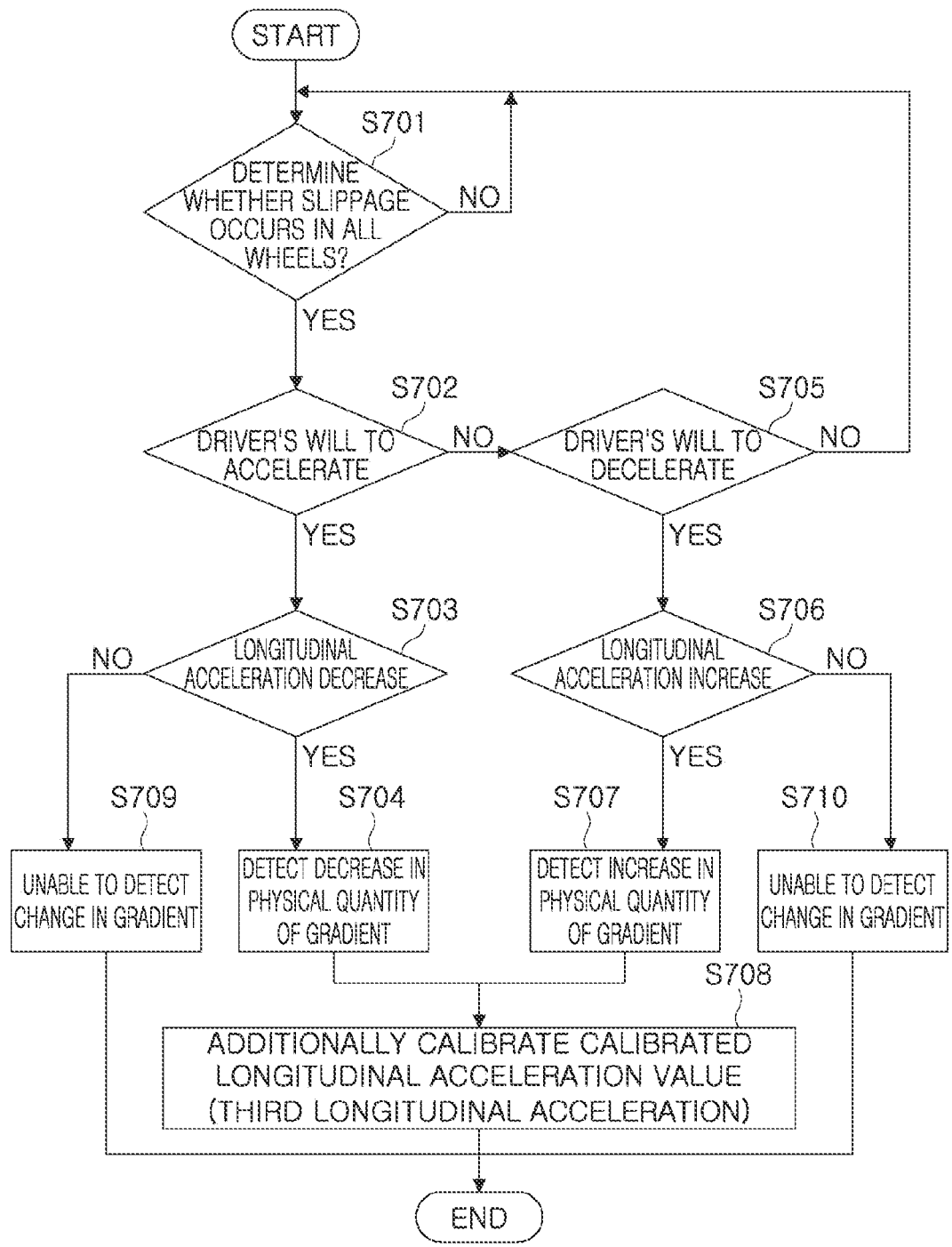
FIG. 11 is a diagram illustrating a process of performing additional calibration when a physical quantity of a gradient of a road surface rapidly changes according to an exemplary embodiment of the present disclosure.
Figure 12A:
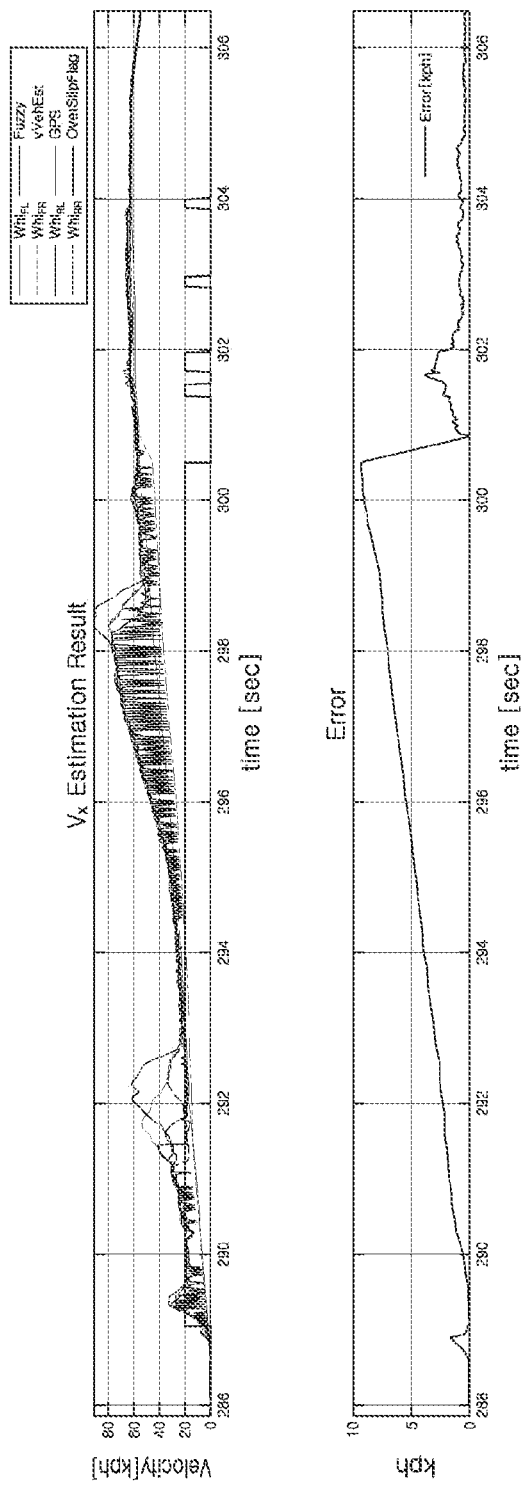
FIG. 12A is a diagram illustrating an estimated speed and an error depending on a result of performing additional calibration based on a change in physical quantity of a gradient of a road surface according to the related art.
Figure 12B:
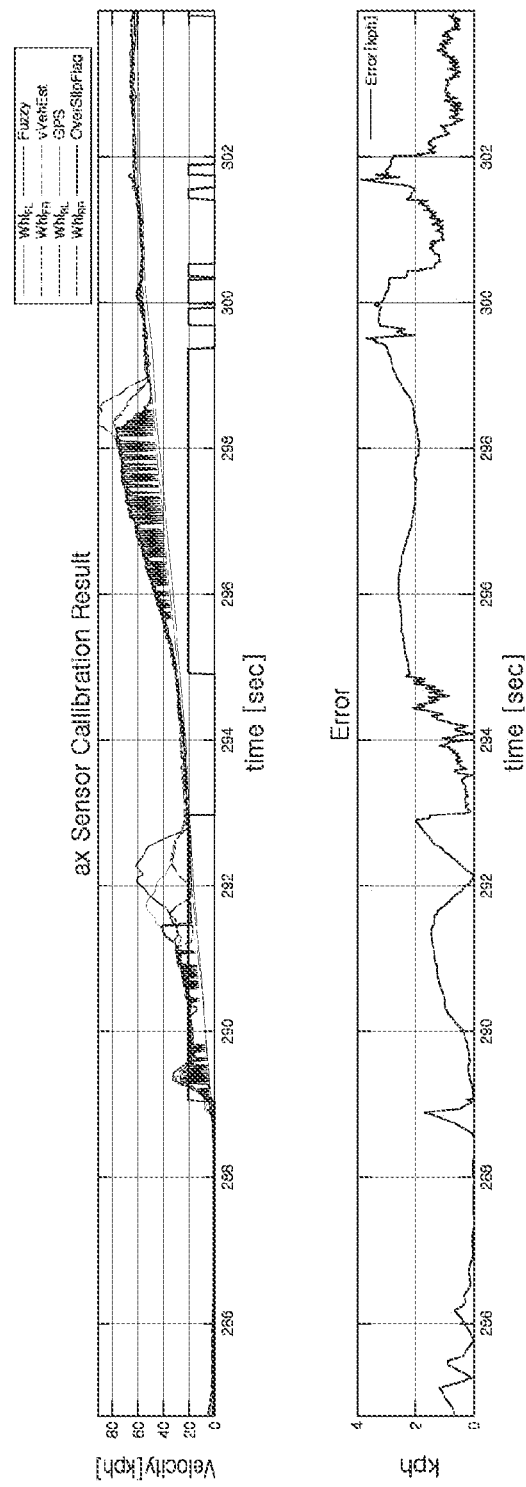
FIG. 12B is a diagram illustrating an estimated speed and an error depending on a result of performing additional calibration based on a change in physical quantity of a gradient of a road surface according to an exemplary embodiment of the present disclosure.

FIG. 11 is a diagram illustrating a process of performing additional calibration when a physical quantity of a gradient of a road surface rapidly changes according to an exemplary embodiment of the present disclosure. FIG. 12A is a diagram illustrating an estimated speed and an error depending on a result of performing additional calibration based on a change in physical quantity of a gradient of a road surface according to the related art. FIG. 12B is a diagram illustrating an estimated speed and an error depending on a result of performing additional calibration based on a change in physical quantity of a gradient of a road surface according to an exemplary embodiment of the present disclosure.

In a state in which slippage occurs in all wheels of a vehicle, when a physical quantity of a gradient of a road on which the vehicle is travelling changes, a vehicle speed value estimated before the physical quantity of the gradient of the road changes may be meaningless. Accordingly, the longitudinal acceleration calibrator 400 may be configured to determine whether slippage occurs in all the wheels provided in the vehicle (S701), and may need to perform additional calibration by determining whether the physical quantity of the gradient of the road changes and verifying a change amount. Here, a longitudinal acceleration on which the longitudinal acceleration calibrator 400 is configured to perform additional calibration depending on whether the physical quantity of the gradient changes may be referred to as a third longitudinal acceleration.

The longitudinal acceleration calibrator 400 may verify a change due to gravity, that is, a change in the physical quantity of the gradient, through a driver's will to accelerate or decelerate and whether a longitudinal acceleration value received from the vehicle information receiver 100 decreases or increases.

Here, a unit of the physical quantity of the gradient may be a unit of m/s² in terms of calibrating a sensor offset. The present disclosure is not limited thereto, and the unit of the physical quantity of the gradient may have a unit of percent (%) or degree. The physical quantity of the gradient having a unit of m/s² may have a positive value for an uphill and a negative value for a downhill, with respect to "0." Accordingly, it is possible to distinguish whether the road on which the vehicle is travelling is the uphill or the downhill through a value of the physical quantity of the gradient.

Referring to FIG. 11, when slippage occurs in all wheels of the vehicle, the longitudinal acceleration calibrator 400 may confirm a user's will to accelerate or decelerate (S701, S702 and S705). Here, the user's will to accelerate or decelerate may be determined by an amount of an accelerator being opened by the user. The driver's will to accelerate and the driver's will to decelerate may be determined based on a change in stroke of an accelerator pedal received from the vehicle information receiver 100. When a change amount in the stroke of the accelerator pedal changes in a direction of an increase, it may be determined that the user has a will to accelerate. When a change amount in stroke of the accelerator pedal changes in the direction of a decrease, it may be determined that the user has a will to decelerate.

When it is determined that the driver has a will to accelerate (S702), it may be determined whether a current longitudinal acceleration is reduced as compared to a longitudinal acceleration when slippage occurs in all wheels of the vehicle (S703). In a case in which it is determined that the driver has a will to accelerate, when the longitudinal acceleration decreases, it may be determined that the physical quantity of the gradient decreases (S704).

For example, when the longitudinal acceleration of the vehicle decreases from 3 m/s² to 1 m/s² despite the driver's will to accelerate, it may be determined that the physical quantity of the gradient decreases from a steep uphill to a gentle uphill. Furthermore, when the longitudinal acceleration of the vehicle decreases from 3 m/s² to −8 m/s² despite the driver's will to accelerate, it may be determined that the uphill is converted to the downhill.

In addition, when it is determined that the driver has a will to decelerate (S705), it may be determined whether the current longitudinal acceleration increases as compared to the longitudinal acceleration when slippage occurs in all wheels of the vehicle (S706). In a case in which it is determined that the driver has a will to decelerate, when the longitudinal acceleration increases, it may be determined that the physical quantity of the gradient increases (S707).

For example, when the longitudinal acceleration of the vehicle increases from 3 m/s² to 5 m/s² despite the driver's will to decelerate, it may be determined that the physical quantity of the gradient increases from the gentle uphill to the steep uphill. Furthermore, when the longitudinal acceleration of the vehicle increases from −3 m/s² to 1 m/s² despite the driver's will to decelerate, it may be determined that the downhill is converted to the uphill.

As described above, the determination of the change amount in the physical quantity of the gradient (S704 and S707) may be represented by Equation 12.

$$\text{CHANGE AMOUNT IN PHYSICAL QUANTITY OF GRADIENT} = \text{INITIAL LONGITUDINAL ACCELERATION} - \text{CURRENT LONGITUDINAL ACCELERATION} \qquad \text{[Equation 12]}$$

Here, the initial acceleration may be a longitudinal acceleration measured immediately before wheel slip occurs in all wheels of the vehicle, and the current acceleration may be a longitudinal acceleration transmitted in real time through the vehicle information receiver.

When the longitudinal acceleration decreases despite the user's will to accelerate or when the longitudinal acceleration increases despite the user's will to decelerate, the longitudinal acceleration calibrator 400 may obtain the third longitudinal acceleration by removing the change amount in the physical quantity of the gradient from the first longitudinal acceleration (S708). An equation for determining the third longitudinal acceleration may be a same as Equation 13.

THIRD LONGITUDINAL ACCELERATION = [Equation 13]

FIRST LONGITUDINAL ACCELERATION − CHANGE
AMOUNT IN PHYSICAL QUANTITY OF GRADIENT

When the longitudinal acceleration increases in a case in which it is determined that the driver includes a will to accelerate (S709), or when the longitudinal acceleration decreases in a case in which it is determined that the driver has a will to decelerate (S710), a change in gradient may not be detected so that longitudinal acceleration calibration may not be performed. The reason why the longitudinal acceleration increases depending on the driver's will to accelerate or decreases depending on the driver's will to decelerate may be because it is not possible to detect the change in the gradient due to the driver's will and a change in longitudinal acceleration corresponding to each other.

Referring to FIG. 12A and FIG. 12B, an error between an estimated speed in a case in which the change amount in the physical quantity of the gradient is considered and an estimated speed in a case in which the change amount in the physical quantity of the gradient is not considered. Referring to FIG. 12A, in the case in which the change amount in the physical quantity of the gradient is not considered, a cumulative integration error generated when a speed is estimated by integrating the longitudinal acceleration may be 10 kph. Conversely, referring to FIG. 12B, it may be confirmed that a maximum integration error may be reduced to about 3.7 kph when the third longitudinal acceleration obtained by additionally calibrating the longitudinal acceleration is used in consideration of the change in the physical quantity of the gradient of the vehicle.

Referring back to FIG. 1, the vehicle speed estimating apparatus 10 according to an exemplary embodiment of the present disclosure may further include the off-road determiner 300. The vehicle speed estimating apparatus 10 may be configured to determine whether a road on which the vehicle is travelling is off-road to apply a disturbance gain for determining whether wheel slip occurs in a different manner, improving the accuracy of the estimated speed. Here, the off-road may be an unpaved road such as sand, gravel, or the like, and may be a terrain having a large variation in speed of a vehicle wheel.

Figure 13:
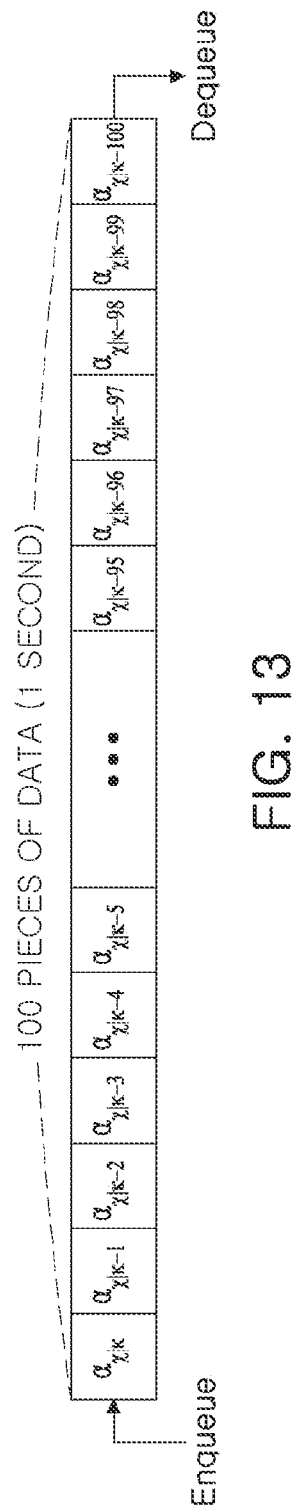
FIG. 13 is a diagram illustrating a queue structure according to an exemplary embodiment of the present disclosure.

FIG. 13 is a diagram illustrating a queue structure according to an exemplary embodiment of the present disclosure.

Referring to FIG. 13, the off-road determiner 300 according to an exemplary embodiment of the present disclosure may be configured to generate a queue structure, and may be configured to determine whether a road on which a vehicle is travelling is off-road using a statistical value of a longitudinal acceleration stored in the generated queue structure. Here, the queue may refer to a programming structure in which data is sequentially output in an order in which data is enqueued, that is, values enqueued first are output first. According to an exemplary embodiment of the present disclosure, the off-road determiner 300 may include a queue structure configured for storing 100 pieces of data, and may store 100 pieces of longitudinal acceleration data received from the vehicle information receiver 100 per second.

When the vehicle travels off-road, the vehicle may not have a high acceleration, but have large vibrations due to disturbance of a road surface so that the longitudinal acceleration of the vehicle may have wide dispersion, that is, large variance. Accordingly, the off-road determiner 300 may be configured to determine that the road on which the vehicle is travelling is off-road when all 100 pieces of data are present in the queue, an average value of the queue is less than a predetermined value, and a variance value of the queue is greater than the predetermined value. For example, the off-road determiner 300 may be configured to determine that the road on which the vehicle is travelling is off-road when an average value of 100 pieces of data stored in the queue is less than a preset upper limit value (for example, 1.3 m/s$^2$), and a variance value of 100 pieces of data stored in the queue is a preset lower limit value (for example, 0.6 m/s$^2$). However, the present disclosure is not limited thereto, and various values may be applied for off-road determination depending on a type of vehicle.

In determining whether a vehicle is travelling off-road using a queue, whether a road on which the vehicle is travelling is off-road may be determined based on the above criteria only when all pieces of data are enqueued to a queue having a preset size, to improve reliability. In a case to be described below, pieces of data in the queue may be initialized, and it may be determined that the road is not off-road.

When there is no accelerator pedal stroke sensor value received from the vehicle information receiver 100 (for example, when the accelerator pedal stroke sensor value is 0), when a minimum wheel speed and a maximum wheel speed, among wheel speeds received from the vehicle information receiver 100, are maintained within a preset range for a predetermined time period or more, or when a road surface friction coefficient received from the vehicle information receiver 100 has a high road surface friction coefficient (high-mue) greater than or equal to a predetermined value, the off-road determiner 300 may initialize values enqueued to the queue. Here, initializing the values enqueued to the queue may refer to deleting all values enqueued to the queue.

The absence of the accelerator pedal stroke sensor value received from the vehicle information receiver 100 may mean that the user has no will to accelerate, and the vehicle may not vibrate or slippage even when the road is off-road.

Furthermore, when travelling off-road, a large wheel speed difference between wheels provided in the vehicle may occur. That is, when travelling off-road, a difference between a minimum wheel speed and a maximum wheel speed, among wheel speeds generated by individual wheels of the vehicle, may be inevitably large. When a difference between a minimum wheel speed and a maximum wheel speed, among wheel speeds received from the vehicle information receiver 100, is maintained to be less than or equal to a preset value for a predetermined time period, a value enqueued to the queue may be initialized.

Furthermore, when travelling off-road, a road surface friction coefficient (mue) may not include a large value. Thus, when a road surface friction coefficient received from the vehicle information receiver 100 is greater than or equal to a preset road surface friction coefficient, the value enqueued to the queue may be initialized.

As described above, the off-road determiner 300 may be configured to determine whether a road on which the vehicle is travelling is off-road using a queue. When the off-road determiner 300 determines that the road is off-road, corresponding information may be transmitted to the wheel slip determiner 200, and the wheel slip determiner 200 may apply a disturbance gain of a DOB differently depending on whether the road is off-road, determining whether wheel slip occurs.

Figure 14:
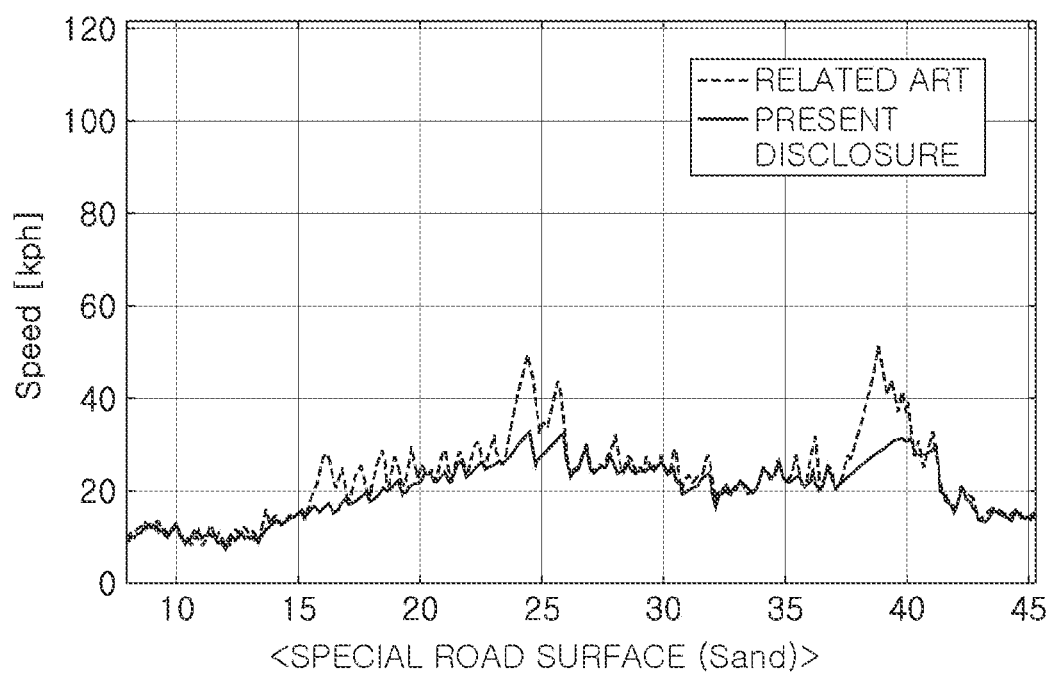
FIG. 14 is a diagram illustrating a difference in estimated speed depending off-road determination according to an exemplary embodiment of the present disclosure.

FIG. 14 is a diagram illustrating a difference in estimated speed depending off-road determination according to an exemplary embodiment of the present disclosure. Referring to FIG. 14, it may be confirmed through an estimated vehicle speed according to an exemplary embodiment of the present disclosure that the vehicle speed is stably estimated without being abnormally changed while travelling off-road, as compared to the related art.

Referring back to FIG. 1, the vehicle speed estimating apparatus 10 according to an exemplary embodiment of the present disclosure may further include the vehicle speed estimator 500. The vehicle speed estimator 500 may estimate a vehicle speed based on a wheel speed of a vehicle received from the vehicle information receiver 100. Furthermore, the vehicle speed estimator 500 may estimate the vehicle speed by integrating a calibrated longitudinal acceleration value received from the longitudinal acceleration calibrator 400.

When slippage does not occur even in at least one wheel, the vehicle speed estimator 500 may estimate the vehicle speed using an average value of wheel speeds of wheels other than a wheel in which slippage occurs, that is, wheels in which slippage does not occur.

When wheel slip occurs in all wheels provided in the vehicle, the vehicle speed estimator 500 may estimate the vehicle speed by integrating the calibrated longitudinal acceleration value received from the longitudinal acceleration calibrator 400.

Furthermore, the vehicle speed estimator 500 may filter the estimated vehicle speed using a preset vehicle speed gradient. In other words, the vehicle speed estimator 500 may set the vehicle speed gradient and exclude an estimated speed exceeding the vehicle speed gradient. In a process of estimating the vehicle speed, there may be cases in which the estimated speed of the vehicle is erroneously determined due to an error such as erroneously performing longitudinal acceleration calibration, erroneously determining wheel slip, or the like. The vehicle speed estimator 500 may improve the reliability of the estimated speed by filtering the erroneously estimated value using the vehicle speed gradient.

The vehicle speed gradient may be set depending on a road surface friction coefficient. The vehicle speed gradient may be set to include a smaller value as the road surface friction coefficient is lower, and the vehicle speed gradient may be set to include a larger value as the road surface friction coefficient is higher. Here, the vehicle speed gradient value may be defined as acceleration. For example, the vehicle speed gradient may be set to include a preset value (for example, ±0.3 g) when the road surface friction coefficient is low, and the vehicle speed gradient may be set to include a preset value (for example, ±1.5 g) when the road surface friction coefficient is high.

The vehicle speed estimator 500 may apply a boundary value of the vehicle speed gradient when a value exceeding the vehicle speed gradient is estimated. The vehicle speed estimator 500 may continuously determine a speed for a preset vehicle speed gradient to correspond to the vehicle speed.

The vehicle speed estimator 500 may compare, to each other, an upper limit value and a lower limit value determined using the preset vehicle speed gradient with respect to the estimated speed, and exclude values exceeding the preset vehicle speed gradient value, improving the reliability of the estimated speed.

Components of the vehicle speed estimating apparatus 10 may be connected to each other in a wired or wireless manner to exchange information. For example, data may be exchanged using communication means such as Ethernet, media-oriented systems transport (MOST), Flexray, Controller Area Network (CAN), Local Interconnect Network (LIN), Internet, LTE, 5G, Wi-Fi, Bluetooth, Near Field Communication (NFC), Zigbee, and radio frequency (RF).

Figure 15:
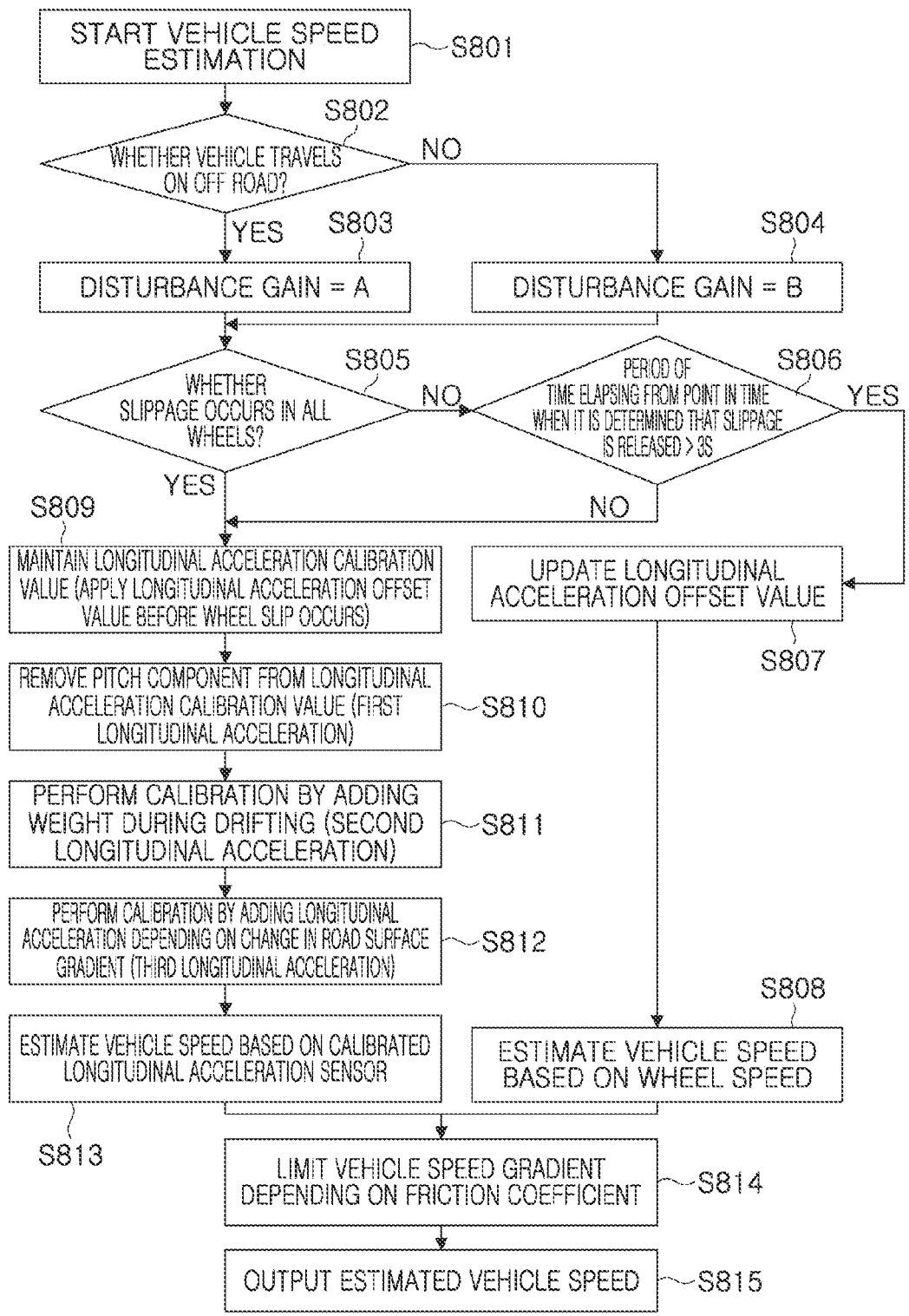
FIG. 15 is a flowchart illustrating a process of estimating a vehicle speed according to an exemplary embodiment of the present disclosure.

FIG. 15 is a flowchart illustrating a process of estimating a vehicle speed according to an exemplary embodiment of the present disclosure.

In a method of estimating a speed of a vehicle according to an exemplary embodiment of the present disclosure, a method of estimating the speed may be applied differently depending on whether wheel slip occurs in all wheels provided in the vehicle, more accurately estimating the estimated speed of the vehicle.

Referring to FIG. 15 together with FIG. 1, the method for estimating a vehicle speed according to an exemplary embodiment of the present disclosure may be configured to determine whether a road on which the vehicle is travelling is off-road, using a queue (S802). Here, the queue may be a first in first out (FIFO) data processing structure. The off-road determiner 300 may be configured to determine whether the road on which the vehicle is travelling is off-road using a queue structure having a predetermined size. For example, the off-road determiner 300 may include a queue structure configured for storing 100 pieces of data, and may store longitudinal acceleration data measured by a longitudinal acceleration sensor. Data may be enqueued in chronological order, with 100 longitudinal acceleration values enqueued per second. As new data is enqueued, data in excess of 100 pieces of data may be dequeued in an order in which data is enqueued first.

The off-road determiner 300 may be configured to determine that the vehicle is travelling off-road when all queue data pieces is enqueued, an average value of the enqueued queue data pieces is less than a preset value, and a variance value of the enqueued queue data pieces is greater the preset value. Here, the average value of the queue data pieces and the variance value of the queue data pieces may be set considering that the vehicle does not have a high acceleration and the variance value is large depending on vibrations of the vehicle when travelling off-road.

For example, the off-road determiner 300 may be configured to determine that the vehicle is traveling off-road when all 100 pieces of queue data are enqueued, an average value of the enqueued queue data pieces is less than a preset upper limit value (for example, 1.3 m/s$^2$), and a variance value of the enqueued queue data pieces is greater than a preset lower limit value (for example, 0.6 m/s$^2$). The average value and the variance value of the queue data pieces are not limited thereto, and may be applied depending on a type of vehicle and a travel environment in various manners.

The off-road determiner 300 may initialize the queue data pieces under specific conditions. For example, when there is no stroke of the accelerator pedal, that is, when a user has no will to accelerate, vibrations and slippage may not occur even off-road so that the queue data pieces may be initialized. Furthermore, when a difference between a maximum wheel speed and a minimum wheel speed is within a predetermined range, the queue data pieces may be initialized. This may be because there is a large difference between the maximum speed and the minimum speed of the wheel when travelling off-road. Furthermore, when a road surface friction coefficient of the road on which the vehicle is travelling is greater than or equal to a predetermined value, the queue data pieces may be initialized. This may be because the off-road has a low road surface friction coefficient.

In the method of estimating a vehicle speed according to an exemplary embodiment of the present disclosure, the off-road determiner 300 may be configured to determine whether the road on which the vehicle is travelling is off-road. The wheel slip determiner 200 may be configured to determine a disturbance gain of a DOB depending on whether the road is off-road, and may be configured to determine whether wheel slip occurs based on a force acting on the wheel by applying the determined disturbance gain. Furthermore, the wheel slip determiner 200 may be configured to determine whether wheel slip is released using an extremum seeking algorithm.

The wheel slip determiner 200 may be configured to determine whether wheel slip occurs by applying the DOB to reduce the influence of disturbance such as vibrations of vehicle. The wheel slip determiner 200 may be configured to determine whether the road on which the vehicle is travelling is off-road (S802), and may apply the disturbance gain of the DOB differently depending on whether the road is off-road, reducing the influence of a road surface condition or the like (S803 and S804). As described above, as the disturbance gain of the DOB includes a larger value, filtering may be reduced, reducing the influence of the road surface condition or the like and increasing the sensitivity of slippage determination. Accordingly, a disturbance gain value may be reduced when travelling on a road surface, not off-road (S804), and the disturbance gain value may be increased when travelling off-road (S803).

Here, the wheel slip determiner 200 according to an exemplary embodiment of the present disclosure may be configured to determine whether wheel slip occurs based on the force acting on the wheel so that a stabilization time period required in a method of determining whether wheel slip occurs based on a difference between a wheel speed and a longitudinal acceleration according to the related art may not be necessary.

In the method of estimating a vehicle speed according to an exemplary embodiment of the present disclosure, the vehicle speed estimation method may be applied differently depending on whether wheel slip occurs in all wheels of the vehicle (S805). The wheel slip determiner 200 of the present disclosure may be configured to determine whether wheel slip of the vehicle occurs based on the force acting on the wheels of the vehicle, and may determine, based on the extremum seeking algorithm, a point in time at which wheel slip of the vehicle does not occur, that is, whether wheel slip is released.

The vehicle speed estimator 500 may estimate, based on a determination result of the wheel slip determiner 200 (S805), the vehicle speed (S808 and S813).

When wheel slip does not occur even in at least one wheel of the vehicle, the vehicle speed may be estimated using an average value of wheel speeds of wheels in which wheel slip does not occur. Furthermore, among wheels provided in the vehicle, an optimal wheel for estimating a wheel speed may be selected, and the vehicle speed may be estimated based on a wheel speed of the selected wheel (S808). As a method of estimating a vehicle speed based on the wheel speed, various known methods may be applied.

Furthermore, in a reliable situation in which wheel slip does not occur, a longitudinal acceleration offset value may be continuously determined and the determined longitudinal acceleration offset value may be updated (S807).

Furthermore, even in a case in which wheel slip does not occur in at least one wheel, when wheel slip does not occur in at least one wheel in a state in which slippage occurs on all wheels, that is, when it is determined that slippage is released, the longitudinal acceleration offset value may be updated again after a preset time period elapses (S806). When it is determined that wheel slip occurs using a Kalman filter according to an exemplary embodiment of the present disclosure, due to the nature of the Kalman filter, a predetermined time period may be required after wheel slip is released in at least one wheel of the vehicle, to estimate a reliable longitudinal acceleration offset value. Accordingly, even when wheel slip is released in at least one wheel, a previous longitudinal acceleration offset value may be applied without change before a preset time period (for example, 3 seconds) elapses, and may update and apply the longitudinal acceleration offset value estimated using the Kalman filter after the preset time period elapses. Here, information on whether wheel slip occurs and whether wheel slip is released may be transmitted from the wheel slip determiner 200.

In a case in which wheel slip occurs in all wheels provided in the vehicle, when a vehicle speed is estimated based on a wheel speed, it may be difficult to trust the estimated vehicle speed. Accordingly, in the method of estimating a vehicle speed according to an exemplary embodiment of the present disclosure, the vehicle speed may be estimated by integrating a longitudinal acceleration sensor when wheel slip occurs in all wheels of the vehicle. Here, the reliability of the estimated speed may be improved by applying a longitudinal acceleration offset value determined before wheel slip occurs (S809).

In the method of estimating a vehicle speed by integrating the longitudinal acceleration sensor, errors of the longitudinal acceleration sensor may be accumulated so that it may be important to accurately calibrate a value of the longitudinal acceleration as much as possible. The longitudinal acceleration calibrator 400 according to an exemplary embodiment of the present disclosure may be configured to determine and calibrate an offset value of the longitudinal acceleration measured by the longitudinal acceleration sensor using the Kalman filter. Here, calibration of removing a pitch angle generated during acceleration of the vehicle may be further performed on a longitudinal acceleration calibration value using the Kalman filter. Longitudinal acceleration obtained by calibrating, by the longitudinal acceleration calibrator 400, a pitch angle of the vehicle and a longitudinal acceleration offset value determined from a longitudinal acceleration, received through the vehicle information receiver 100, using the Kalman filter may be referred to as first longitudinal acceleration (S810).

When drift occurs in the vehicle, the longitudinal acceleration calibrator 400 may additionally calibrate the first longitudinal acceleration (S811). The longitudinal acceleration calibrator 400 may preset a weight for a lateral slippage angle. The longitudinal acceleration calibrator 400 may further perform calibration of multiplying the first longitudinal acceleration by a preset weight corresponding to a lateral slippage angle received through the vehicle information receiver 100. Here, a longitudinal acceleration on which additional calibration is performed by multiplying the first longitudinal acceleration by the weight corresponding to the lateral slippage angle may be referred to as a second longitudinal acceleration. Here, the weight may be closer to 0 as the lateral slippage angle increases, and may be closer to 1 as the lateral slippage angle decreases.

When a physical quantity of a gradient of the road on which the vehicle is travelling changes (S812), the longitudinal acceleration calibrator 400 may perform additional calibration on the physical quantity of the gradient. In a situation in which slippage occurs in all wheels provided in the vehicle, the longitudinal acceleration calibrator 400 may be configured to determine a change in physical quantity of a gradient of a road surface using accelerator pedal information and longitudinal acceleration information received from the vehicle information receiver 100.

The longitudinal acceleration calibrator 400 may be configured to determine that the user has a will to accelerate when a stroke of the accelerator pedal increases, and may be configured to determine that the user includes a will to decelerate when the stroke of the accelerator pedal decreases. The longitudinal acceleration calibrator 400 may be configured to determine that there is a change in physical quantity of a gradient of a road surface on which the vehicle is travelling when the longitudinal acceleration decreases despite the user's will to accelerate or the longitudinal acceleration increases despite the user's w-ill to decelerate. When it is determined that there is a change in the physical quantity of the gradient, the longitudinal acceleration calibrator 400 may additionally perform calibration on the first longitudinal acceleration depending on the change in the physical quantity of the gradient. Here, a change amount in the physical quantity of the gradient may be a value obtained by subtracting a current acceleration from an initial acceleration, and an acceleration obtained by calibrating a change amount in physical quantity of a gradient of the first longitudinal acceleration may be referred to as a third longitudinal acceleration.

When wheel slip occurs in all wheels of the vehicle, the vehicle speed estimator 500 may integrate one of the first longitudinal acceleration, the second longitudinal acceleration, and the third longitudinal acceleration obtained by calibrating the longitudinal acceleration depending on a travel state, estimating the vehicle speed (S813).

The vehicle speed estimator 500 may set a vehicle speed gradient, based on the road surface friction coefficient of the road on which the vehicle is travelling. When a magnitude of an estimated speed gradient formed by the estimated speed deviates from a preset vehicle speed gradient, a value of the estimated speed may be ignored. The vehicle speed estimator 500 may apply a value corresponding to the vehicle speed gradient when the estimated speed deviates from the preset vehicle speed gradient (S814).

For example, the vehicle speed gradient may be set to ±0.3 g when a road surface friction coefficient received from the vehicle information receiver 100 is 0.3, and a vehicle speed corresponding to ±0.3 g may be output as an estimated speed when an estimated vehicle speed gradient formed by the estimated speed is greater than ±0.3 g. Furthermore, a limit acceleration may be set to ±1.5 g when the road surface friction coefficient received from the vehicle information receiver 100 is 0.8, and a speed corresponding to ±1.5 g may be output as an estimated speed when an estimated vehicle speed gradient formed by the estimated speed is greater than ±1.5 g (S815).

The vehicle speed estimator 500 may prevent takeoff of the estimated vehicle speed using the estimated speed as a limit acceleration value depending on the road surface friction coefficient.

Figure 16A:
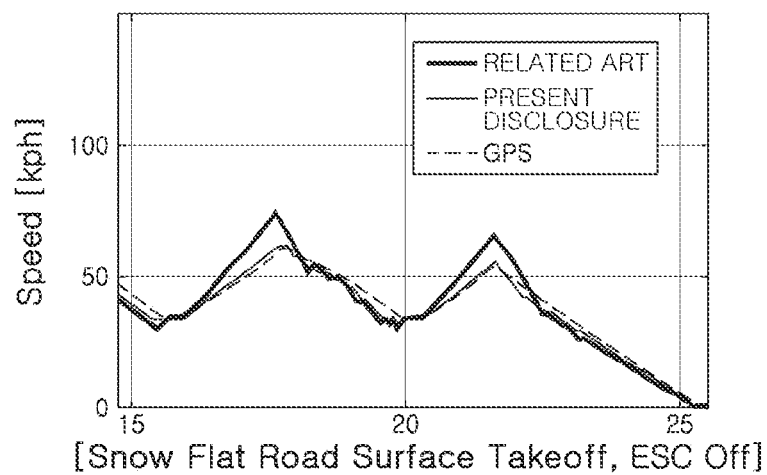
FIG. 16A, FIG. 16B, and FIG. 16C are graphs illustrating an estimated vehicle speed according to an exemplary embodiment of the present disclosure and an estimated vehicle speed according to the related art.
Figure 16B:
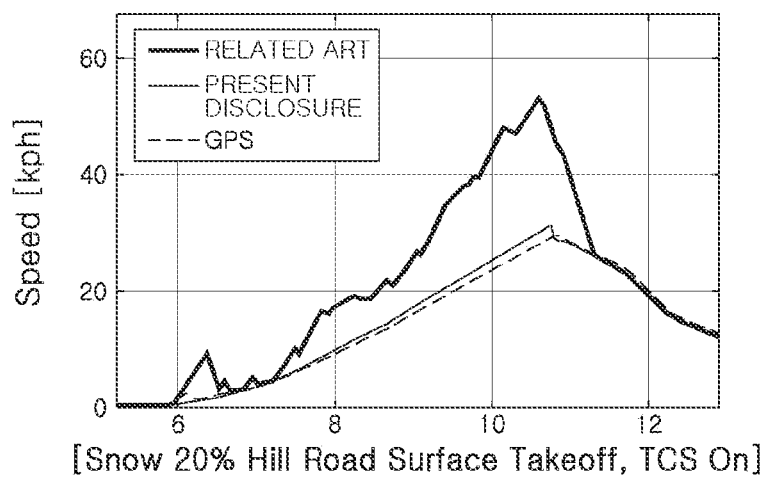
Figure 16C:
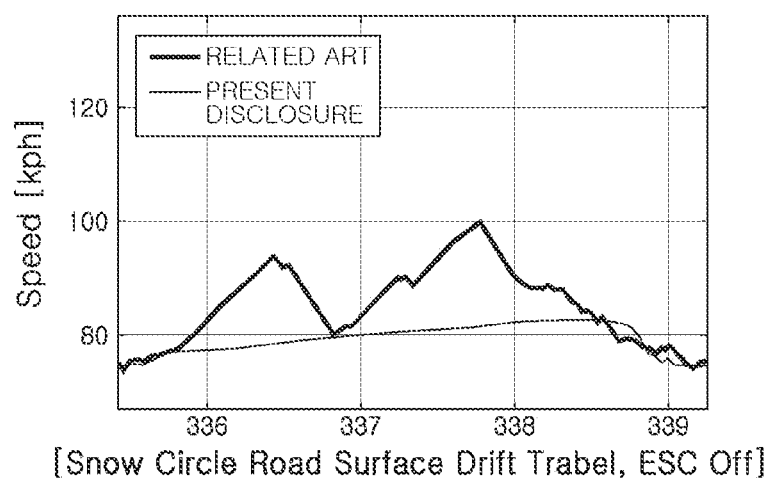

FIG. 16A, FIG. 16B, and FIG. 16C are graphs illustrating an estimated vehicle speed according to an exemplary embodiment of the present disclosure and an estimated vehicle speed according to the related art.

Here, the related art may use a method of estimating a vehicle speed based on a wheel speed.

In a case in which a vehicle travels on a flat snowy road, FIG. 16A illustrates speeds estimated using techniques according to the related art and the present disclosure. In a case in which a vehicle travels on a snowy hill road, FIG. 16B illustrates speeds estimated using techniques according to the related art and the present disclosure. In a case in which a vehicle travels on a snowy circular road, FIG. 16C illustrates speeds estimated using techniques according to the related art and the present disclosure.

According to the related art, it may be confirmed that an estimated vehicle speed fluctuates depending on whether slippage of a wheel of the vehicle occurs. When slippage occurs in the wheel, a speed of the wheel may rapidly increase. It may be confirmed that an error of the estimated vehicle speed increases due to the influence of the rapidly increasing wheel speed.

Conversely, when the vehicle speed is estimated according to an exemplary embodiment of the present disclosure, it may be confirmed that the vehicle speed is almost similar to a vehicle speed according to a Global Positioning System (GPS) showing an actual travel speed of the vehicle, even when wheel slip of the vehicle occurs and the wheel speed abnormally increases, the vehicle speed with a constant trend may be stably estimated regardless of the wheel speed. It may be confirmed that an error with the actual vehicle speed according to the Global Positioning System (GPS) is greatly improved.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

Examples of non-transitory computer-readable media include hardware devices that are specially configured to store and perform program instructions, such as read-only memory (ROM), random access memory (RAM), flash memory, and the like. Examples of program instructions include both machine code, such as produced by a compiler, and higher-level code which may be executed by the computer using an interpreter. The above-described devices may be configured to act as one or more software modules to perform the operations of the above-described example embodiments, or vice versa.

The scope of the present disclosure includes software or machine-executable commands (e.g., an operating system, an application, firmware, a program, etc.) for enabling operations according to the methods of various embodiments to be executed on an apparatus, a computer or a controller, a non-transitory computer-readable medium including such software or commands stored thereon and executable on the apparatus, the computer or the controller.

Furthermore, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior". "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example. "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle speed estimating apparatus comprising:
a controller including a processor and configured to:
receive travel information of a vehicle including a wheel speed, a motor torque, and a longitudinal acceleration of the vehicle;
determine whether wheel slip occurs with respect to each wheel of the vehicle;
calibrate the longitudinal acceleration;
estimate, depending on a result of the determining in the controller for all wheels subject to wheel slip determination, a vehicle speed using the wheel speed or the longitudinal acceleration; and
wherein the controller is further configured for estimating torque generated by traction force of each wheel using a disturbance observer, and
wherein the controller is further configured to determine, based on whether the vehicle travels off-road, a disturbance gain of the disturbance observer used to estimate the torque generated by the traction force of each wheel and control the vehicle by using the determined disturbance gain via the disturbance observer.

2. The vehicle speed estimating apparatus of claim 1, wherein the controller is further configured to:
estimate the traction force of each wheel; and
determine, based on the torque generated by the estimated traction force of each wheel and the motor torque acting on each wheel, whether the wheel slip of the vehicle occurs.

3. The vehicle speed estimating apparatus of claim 2, wherein, in estimating the traction force of each wheel and a differential value of the wheel speed of each wheel, the controller is further configured to set an initial value of one of the traction force and the differential value of the wheel speed to recursively estimate the traction force and the differential value of the wheel speed.

4. The vehicle speed estimating apparatus of claim 3, wherein the controller further configured to set the initial value of the traction force to "0" to recursively estimate the traction force and the differential value of the wheel speed.

5. The vehicle speed estimating apparatus of claim 1, wherein a value applied to the disturbance gain in a case in which the vehicle travels off-road is greater than a value applied to the disturbance gain in a case in which the vehicle does not travel off-road.

6. The vehicle speed estimating apparatus of claim 1, wherein the controller is further configured to determine whether the wheel slip that occurs is released, using an extremum seeking algorithm.

7. The vehicle speed estimating apparatus of claim 1, wherein the controller is further configured to determine whether a road on which the vehicle is travelling is off-road, using the longitudinal acceleration and a que structure configured for storing a preset number of pieces of data.

8. The vehicle speed estimating apparatus of claim 7, wherein, in a case in which the preset number of pieces of data are enqueued to the queue structure, the controller is further configured to determine whether the road on which the vehicle is travelling is off-road, using statistical values of the enqueued pieces of data.

9. The vehicle speed estimating apparatus of claim 8, wherein the controller is further configured to determine that the road on which the vehicle is travelling is off-road in a case in which an average value of the pieces of data is less than a preset average value and a variance value of the pieces of data is greater than a preset variance value.

10. The vehicle speed estimating apparatus of claim 7, wherein the controller is further configured to initialize data enqueued to the queue structure in a case in which an accelerator pedal stroke value is "0," a difference between a maximum wheel speed and a minimum wheel speed of each wheel is within a preset range, or a road surface friction coefficient is greater than or equal to a preset value.

11. The vehicle speed estimating apparatus of claim 1, wherein the controller is further configured to determine a first longitudinal acceleration obtained by calibrating a longitudinal acceleration offset and a pitch angle of the longitudinal acceleration.

12. The vehicle speed estimating apparatus of claim 11, wherein the controller is further configured to determine the pitch angle as a value obtained by subtracting a value of the longitudinal acceleration in a steady state from a longitudinal acceleration value at a peak point of the longitudinal acceleration.

13. The vehicle speed estimating apparatus of claim 12, wherein the longitudinal acceleration value at the peak point is a maximum value of the longitudinal acceleration within a preset time period, and the steady state is a stabilized state in which a change in the longitudinal acceleration is maintained within a predetermined range.

14. The vehicle speed estimating apparatus of claim 11, wherein the controller is configured to receive a lateral speed and a yaw rate of the vehicle, and
wherein the controller is further configured to determine the longitudinal acceleration offset, using a Kalman filter using the lateral speed, the yaw rate, and the longitudinal acceleration.

15. The vehicle speed estimating apparatus of claim 11, wherein, in a case in which the controller concludes that the wheel slip occurs in all wheels provided in the vehicle, the controller is further configured to apply a value of the longitudinal acceleration offset before the wheel slip occurs.

16. The vehicle speed estimating apparatus of claim 15, wherein, in a case in which the controller concludes that the wheel slip occurring in at least one wheel provided in the vehicle is released, the controller is further configured to apply the value of the longitudinal acceleration offset before the wheel slip occurs within a preset time period from a point in time at which the wheel slip is released.

17. The vehicle speed estimating apparatus of claim 15, wherein the controller is configured to receive a lateral speed and a yaw rate of the vehicle, and
wherein in the case in which the controller concludes that the wheel slip occurring in at least one wheel provided in the vehicle is released, the controller is further configured to update the value of the longitudinal acceleration offset, using a Kalman filter using the lateral speed, the yaw rate, and the longitudinal acceleration, when a preset time period from a point in time at which the wheel slip is released is exceeded.

18. The vehicle speed estimating apparatus of claim 11, wherein, in a case in which drift occurs in the vehicle, the controller is further configured to determine a second longitudinal acceleration obtained by performing calibration of multiplying the first longitudinal acceleration by a weight.

19. The vehicle speed estimating apparatus of claim 18, wherein the weight is preset to correspond to a lateral slippage angle, and
wherein the weight is set to include a smaller value as the lateral slippage angle increases.

20. The vehicle speed estimating apparatus of claim 11, wherein the controller is further configured to determine a third longitudinal acceleration obtained by calibrating a change in physical quantity of a gradient of a road, on which the vehicle is travelling, of the first longitudinal acceleration.

21. The vehicle speed estimating apparatus of claim 20, wherein the controller is further configured to determine a change in the physical quantity of the gradient of the road on which the vehicle is travelling, considering a change in stroke of an accelerator pedal and a change in the longitudinal acceleration together.

22. The vehicle speed estimating apparatus of claim 1, wherein the controller is further configured for estimating a speed of the vehicle using an average value of wheel speeds of wheels in which the wheel slip does not occur, when the controller concludes that the wheel slip does not occur in at least one wheel.

23. The vehicle speed estimating apparatus of claim 1, wherein, in a case in which the controller concludes that the wheel slip occurs in all wheels, the controller is further configured for estimating a speed of the vehicle using the longitudinal acceleration.

24. The vehicle speed estimating apparatus of claim 1, wherein the controller is further configured to:
   preset a vehicle speed gradient value; and
   in a case in which a vehicle speed gradient formed by the estimated vehicle speed deviates from the preset vehicle speed gradient value, determine a vehicle speed corresponding to the vehicle speed gradient as an estimated vehicle speed.

25. The vehicle speed estimating apparatus of claim 24, wherein the vehicle speed gradient value is preset to correspond to a road surface friction coefficient of a road on which the vehicle is travelling, and increases as the road surface friction coefficient increases.

\* \* \* \* \*